(12) United States Patent
Tamura

(10) Patent No.: US 8,687,918 B2
(45) Date of Patent: Apr. 1, 2014

(54) IMAGE PROCESSING METHOD, IMAGE PROCESSING SYSTEM, AND COMPUTER PROGRAM

(75) Inventor: Hikaru Tamura, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 724 days.

(21) Appl. No.: 12/393,282

(22) Filed: Feb. 26, 2009

(65) Prior Publication Data

US 2009/0225183 A1    Sep. 10, 2009

(30) Foreign Application Priority Data

Mar. 5, 2008    (JP) ................................ 2008-054626

(51) Int. Cl.

| G09G 5/00 | (2006.01) |
| G06K 9/20 | (2006.01) |
| G06K 9/36 | (2006.01) |
| G06K 9/00 | (2006.01) |
| G06K 9/34 | (2006.01) |
| G06K 9/46 | (2006.01) |
| G06K 9/66 | (2006.01) |
| G06K 9/40 | (2006.01) |
| H04N 9/74 | (2006.01) |

(52) U.S. Cl.
USPC ........... 382/284; 382/107; 382/173; 382/190; 382/255; 348/584; 345/632

(58) Field of Classification Search
USPC ......... 382/100, 103, 107, 153, 173–174, 181, 382/190, 206, 224, 254–258, 260–266, 269, 382/274–275, 282–284; 348/207.99, 348/208.99–208.6, 208.12–208.15, 222.1; 345/418, 581, 611–612, 617, 629, 634, 345/647

See application file for complete search history.

(56) References Cited

U.S. PATENT DOCUMENTS

| 6,157,733 A | 12/2000 | Swain |
| 6,392,620 B1 | 5/2002 | Mizutani et al. |
| 6,614,415 B2 | 9/2003 | Mizutani et al. |

(Continued)

FOREIGN PATENT DOCUMENTS

| CH | 1473313 | 2/2004 |
| EP | 1 403 819 A1 | 3/2004 |

(Continued)

OTHER PUBLICATIONS

Bae, S. and Durand, F. (2007), Defocus Magnification. Computer Graphics Forum, 26: 571-579.*

(Continued)

*Primary Examiner* — Randolph I Chu
*Assistant Examiner* — Nathan Bloom
(74) *Attorney, Agent, or Firm* — Husch Blackwell LLP

(57) ABSTRACT

Based on a difference image of three temporally consecutive frame images, a moving object region where a moving object is displayed and a background region are extracted from a central frame image. A processing of becoming a clear image such as contrast enhancement is performed on an image of the moving object region. On the other hand, a blurring processing such as an averaging processing is performed on an image of the background region. The image of the background region is blurred in this blurring processing so that the degree of blurring increases as the ratio of the moving object region in the frame image is high.

24 Claims, 10 Drawing Sheets

(56) References Cited

U.S. PATENT DOCUMENTS

| | | | |
|---|---|---|---|
| 6,646,687 B1 * | 11/2003 | Vlahos | 348/586 |
| 6,836,293 B2 | 12/2004 | Itoh et al. | |
| 7,142,203 B2 | 11/2006 | Hiroki et al. | |
| 7,256,836 B2 | 8/2007 | Itoh et al. | |
| 7,418,150 B2 | 8/2008 | Myoga | |
| 7,477,289 B2 | 1/2009 | Kondo et al. | |
| 2004/0105493 A1 * | 6/2004 | Kondo et al. | 375/240.08 |
| 2006/0092164 A1 | 5/2006 | Takeuchi et al. | |
| 2007/0040823 A1 | 2/2007 | Hiroki et al. | |
| 2007/0086675 A1 | 4/2007 | Chinen et al. | |
| 2007/0103585 A1 | 5/2007 | Takeuchi et al. | |
| 2007/0230569 A1 | 10/2007 | Itoh et al. | |
| 2007/0236603 A1 | 10/2007 | Itoh et al. | |
| 2008/0079852 A1 | 4/2008 | Nagaishi et al. | |
| 2009/0128478 A1 | 5/2009 | Dembo | |
| 2009/0136158 A1 | 5/2009 | Tamura | |

FOREIGN PATENT DOCUMENTS

| | | |
|---|---|---|
| EP | 1 653 438 A2 | 5/2006 |
| EP | 1 796 045 A2 | 3/2007 |
| JP | 63-157579 | 6/1988 |
| JP | 4-302289 | 10/1992 |
| JP | 8-36145 | 2/1996 |
| JP | 8-185521 | 7/1996 |
| JP | 8-340556 | 12/1996 |
| JP | 9-204159 | 8/1997 |
| JP | 9-233423 A | 9/1997 |
| JP | 10-111491 | 4/1998 |
| JP | 10-233919 | 9/1998 |
| JP | 11-224324 | 8/1999 |
| JP | 2000-512833 | 9/2000 |
| JP | 2000-307952 A | 11/2000 |
| JP | 2001-222264 | 8/2001 |
| JP | 2001-296841 | 10/2001 |
| JP | 2005-147751 | 6/2005 |
| JP | 2005-277916 | 10/2005 |
| JP | 2006-50070 | 2/2006 |
| JP | 2006-133384 | 5/2006 |
| JP | 2006-259899 A | 9/2006 |
| JP | 2007-109235 | 4/2007 |
| JP | 2007-158706 | 6/2007 |
| JP | 2007-264722 | 10/2007 |
| WO | WO 98/48381 A1 | 10/1998 |
| WO | WO 2007/072598 A1 | 6/2007 |

OTHER PUBLICATIONS

Office Action for Chinese application No. CN 200910126193.4, dated May 14, 2012 (with English translation).

Invitation to Pay Additional Fees re application No. PCT/JP2008/071279, dated Dec. 16, 2008.

International Search Report re application No. PCT/JP2008/071279, dated Feb. 3, 2009.

Written Opinion re application No. PCT/JP2008/071279, dated Feb. 3, 2009.

* cited by examiner

FIG. 7A
FIG. 7B
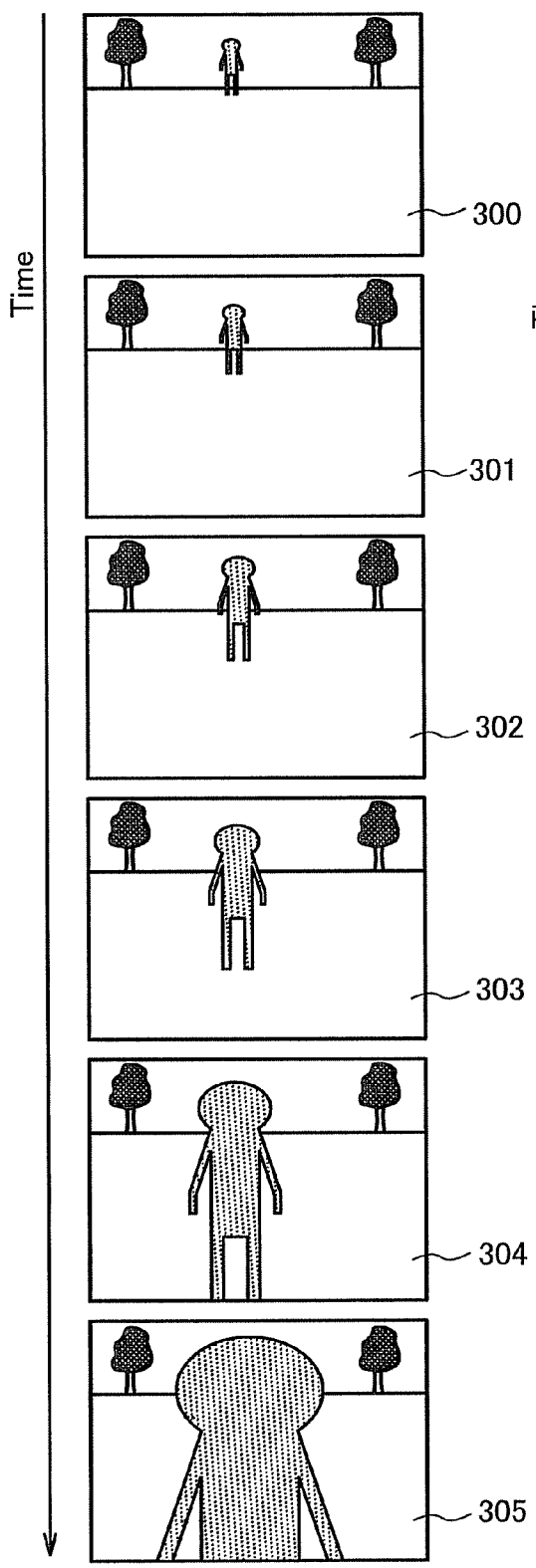
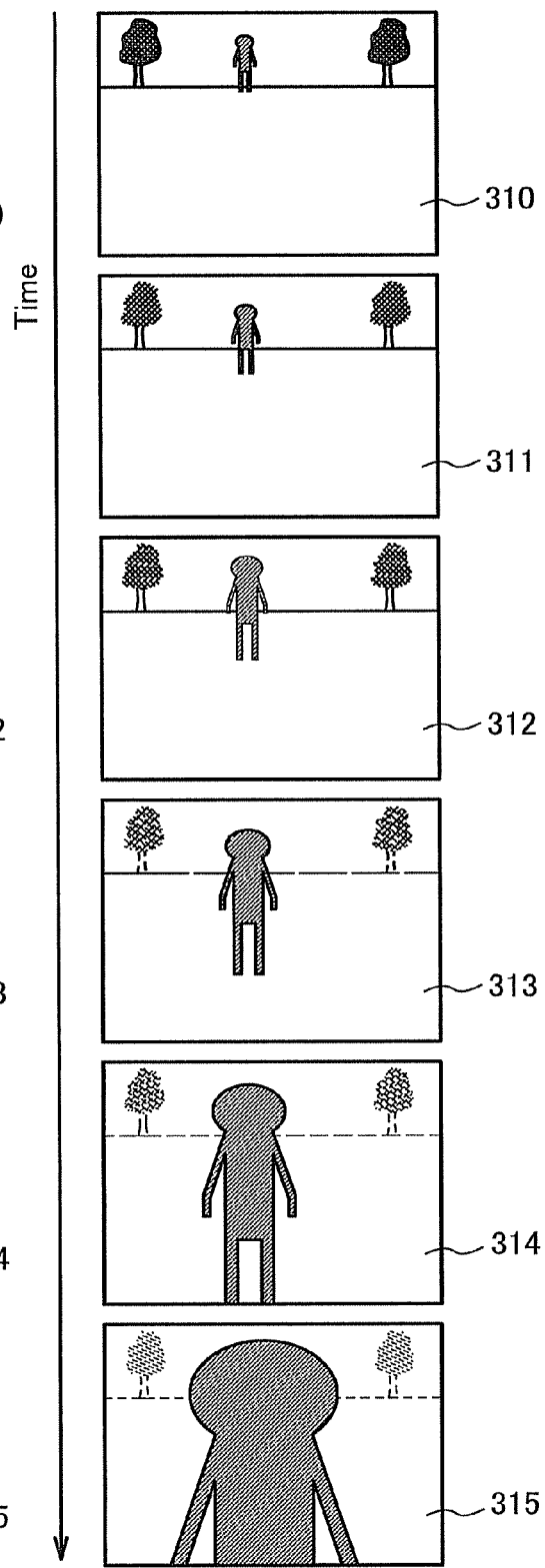

IMAGE PROCESSING METHOD, IMAGE PROCESSING SYSTEM, AND COMPUTER PROGRAM

BACKGROUND OF THE INVENTION

1. Field of the Invention

The present invention relates to a method for processing moving images, an image processing system for processing moving images, and a computer program for processing moving images.

2. Description of the Related Art

In recent years, a liquid crystal display device and a plasma display device which have high resolution and a large screen so that high definition images can be seen have become widely used. Therefore, requests for the quality of images have been increased. One of the requests is realistic sense and perspective (sense of distance), and the realistic sense can be improved by increasing three-dimensional appearance and sense of depth.

For example, a photograph in focus on the entire screen is poor in the sense of distance and the three-dimensional appearance. Thus, conventionally, in order to give the sense of distance and the three-dimensional appearance to a photograph (still image) taken with a camera, a blurring processing (a defocus processing) is performed on the photograph is proposed (e.g. Reference 1: Japanese Published Patent Application No. H10-233919 and Reference 2: Japanese Published Patent Application No. 2005-229198).

In Reference 1, an image processing device is described in which, by using two images that have different focus conditions, a main part and a background are extracted from the images, the image of the main part is sharpened, and a blurring processing is performed on the background.

In Reference 2, an image processing method is described in which, by using two images that have different amounts of lighting, a subject and a background are extracted from the images, and at least one of the subject and the background is subjected to a blurring processing.

SUMMARY OF THE INVENTION

The image processing techniques described in Reference 1 and Reference 2 are techniques related to a still image, but not techniques to enhance the realistic sense and sense of depth of a moving image. Thus, an object of an embodiment mode of the present invention is to provide an image processing method by which moving images with improved three-dimensional appearance and sense of depth can be generated to a display device for displaying two-dimensional images.

Another object of an embodiment mode of the present invention is to provide an image processing system by which moving images with improved three-dimensional appearance and sense of depth can be generated.

Still another object of an embodiment mode of the present invention is to provide a computer program for realizing an image processing method by which a moving image with improved three-dimensional appearance and sense of depth can be generated.

One of structural examples of an image processing method of the present invention is that, in order to process a moving image including a plurality of frame images, at least one of the frame images is divided into a moving object region including a pixel group generating a moving object and a background region including a pixel group not generating the moving object; and an image processing is performed on the background region, and a correction frame image is generated from the frame image. In this structural example, the image processing performed on the background region is a blurring processing in which a blurring effect on the background region is emphasized depending on the ratio of the moving object region in the frame image.

In another structural example of an image processing method of the present invention, in order to divide a frame image that is to be a correction object into a moving object region and a background region other than the moving object region, pixels generating a moving object can be extracted from a first frame image based on a difference between the first frame image to be an correction object and a second frame image which is k frame (or k frames) (k is natural number) before the first frame image and a difference between the first frame image and a third frame image which is k frame (or k frames) after the first frame image, and a mask image formed using a moving object region including a pixel group generating the moving object and a background region including a pixel group not generating the moving object can be generated. In this structural example, it is determined whether each pixel of the first frame image is included in the background region or the moving object region, by using the mask image.

In each structural example of the image processing method, an image processing that is different from the image processing performed on the background region may be performed on the moving object region.

One of structural examples of an image processing system of the present invention includes an image display portion which displays a moving image including a plurality of frame images, a moving object extraction portion which extracts a moving object from at least one of the frame images and divides the frame image into a moving object region including a pixel group generating the moving object and a background region including a pixel group not generating the moving object, and a correction frame image generation portion which generates a correction frame image by performing a blurring processing on the background region. In this structural example, the correction frame image generation portion is a device by which the blurring processing in which a blurring effect on the background region is emphasized depending on the ratio of the moving object region in the frame image is performed.

Another structural example of an image processing system of the present invention includes an image display portion which displays a moving image including a plurality of frame images; a mask image generation portion which extracts a pixel generating a moving object from a first frame image based on a difference between the first frame image to be an correction object and a second frame image which is k frame (or k frames) (k is natural number) before the first frame image and a difference between the first frame image and a third frame image which is k frame (or k frames) after the first frame image, and generating a mask image formed using a moving object region including a pixel group generating the moving object and a background region including a pixel group not generating the moving object; a correction frame image generation portion which determines whether each pixel generating the first frame image is included in the background region or the moving object region, by using the mask image, and which performs a blurring processing on a pixel of the background region and generates a correction frame image.

In this structural example, the correction frame image generation portion is a device by which the blurring processing in which a blurring effect on the background region is emphasized depending on the ratio of the moving object region in the first frame image is performed.

In each structural example of the image processing system, an image processing that is different from the image processing performed on the background region may be performed on the moving object region in the correction frame image generation portion.

One of structural examples of a computer program of the present invention is a computer program which makes an image processing device execute an image processing that includes a processing which extracts a moving object from at least one frame image of a plurality of frame images that generates a moving image and divides the frame image into a moving object region including a pixel group generating the moving object and a background region including a pixel group not generating the moving object, and a processing which generates a correction frame image by performing a blurring processing on the background region. As the image processing performed on the background region in a processing which generates the correction frame image, a blurring processing by which a blurring effect is emphasized depending on the ratio of the moving object region in the frame image is executed by the image processing device.

Another structural example of a computer program of the present invention is a program that makes an image processing device execute an image processing which includes a processing which extracts a pixel generating a moving object from a first frame image based on a difference between the first frame image to be an correction object and a second frame image which is k frame (or k frames) (k is natural number) before the first frame image and a difference between the first frame image and a third frame image which is k frame (or k frames) after the first frame image, and which generates a mask image formed using a moving object region including a pixel group generating the moving object and a background region including a pixel group other than a pixel not generating the moving object; and a processing which determines whether each pixel generating the first frame image is included in the background region or the moving object region by using the mask image, and which performs a blurring processing on a pixel of the background region and generates a correction frame image.

In each structural example of the computer program, in a processing which generates the correction frame image, a blurring processing by which a blurring effect is emphasized depending on the ratio of the moving object region in the first frame image can be executed by the image processing device as the image processing performed on the background region.

When the present invention disclosed in this specification is applied to a computer program, an image processing that is different from the image processing performed on the background region may be executed on the moving object region by the image processing device in a processing which generates a correction frame image.

Although the image processing executed on the background region is a blurring processing, at least one image processing of an averaging processing, a median a filter processing, a contrast conversion processing that weakens contrast, and a mosaic processing may be performed as the blurring processing.

An image processing that is different from that of the background region can be performed on the moving object region in order to generate a correction frame image. In this case, at least one image processing of a sharpening processing, a contrast conversion processing that enhances contrast, and an edge enhancement processing may be performed as the image processing performed on the moving object region.

The blurring processing which changes the degree of blurring in accordance with motion of an image with respect to the background of a frame image generating a moving image is performed, whereby the background can be blurred in accordance with human eye focusing. That is, such a blurring processing is performed on the background, whereby a moving image with great senses of distance and depth can be generated. For example, such a blurring processing is performed on a television image that is received by a television receiver, whereby the television image can be converted into a moving image with a great sense of depth while receiving the image data. Therefore, a television receiver having high added value can be provided.

BRIEF DESCRIPTION OF THE DRAWINGS

FIG. 7A illustrates a frame image before correction, and FIG. 7B illustrates a frame image after correction.

DETAILED DESCRIPTION OF THE INVENTION

Embodiment Mode

Embodiment modes of the present invention will be described with reference to the drawings. However, the present invention disclosed in this specification can be implemented in a variety of different modes, and it is to be easily understood by those skilled in the art that various changes and modifications can be made without any departure from the spirit and scope of the embodiment modes in the present invention disclosed in this specification. Therefore, the present invention disclosed in this specification should not be interpreted as being limited to the description of the embodiment modes.

(Embodiment Mode 1)

In this embodiment mode, an image processing method by which an image processing is performed on a moving image including a plurality of frame images, and an image processing system and a computer program for realizing this image processing will be described.

Figure 1:
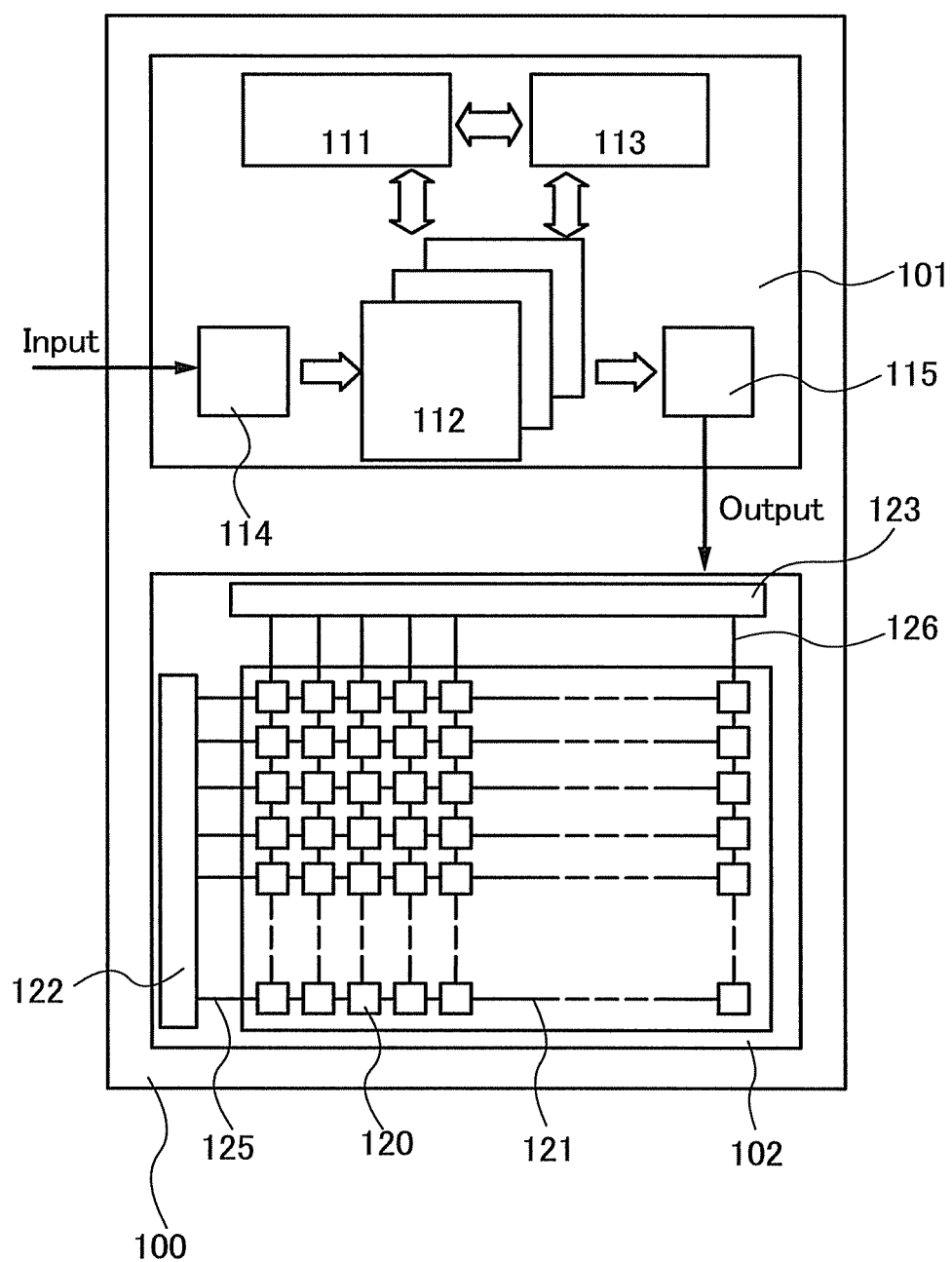
FIG. 1 is a block diagram illustrating a structural example of an image processing system.

First, a structure of an image processing system is described with reference to FIG. 1. In this embodiment mode, an image processing system provided with an image display portion is described as the image processing system. In other words, it can be said that the image processing system of this embodiment mode is an image display system provided with an image processing device. FIG. 1 is a block diagram which illustrates a structural example of the image processing system of this embodiment mode. An image processing system 100 illustrated in FIG. 1 is a device which can display a moving image including a plurality of frame images, and includes an image processing device 101 and an image output device 102.

The image processing device 101 extracts a moving object from at least one of a plurality of frame images which has been read, and divides the frame image into a moving object region including a pixel group that generates the moving object and a background region which is a region other than the moving object region. In addition, the image processing device 101 generates a correction frame image by performing an image processing on the frame image in which the moving object and the background are extracted. In the image processing device 101, a blurring processing is performed on at least the background region of the frame image. In the image processing device 101, an image processing can also be performed on the moving object region. In this embodiment mode, in order to further improve the senses of distance and depth of the moving image after correction, an image processing that is different from the blurring processing is performed on the moving object region in the image processing device 101.

The image output device 102 is a device to which the image data output from the image processing device 101 is output. In this embodiment mode, the image output device 102 is an image display device for displaying two-dimensional images, and displays a moving image including the plurality of frame images.

As illustrated in FIG. 1, the image processing device 101 includes an arithmetic processing portion 111, a data storage portion 112, a control portion 113, an input side interface portion 114, an output side interface portion 115, and the like.

The arithmetic processing portion 111 executes various kinds of arithmetic processings such as an arithmetic processing of image data, and includes a central processing unit (CPU), an arithmetic circuit for an image processing, or the like.

The data storage portion 112 includes various kinds of memory circuits which stores data for executing an image processing in the image processing device 101. For example, the data storage portion 112 includes a read only memory (ROM) which stores a computer program with which the arithmetic processing portion 111 executes an image processing of a moving image, data of a filter for an image processing, a look-up table, and the like; a random access memory (RAM) which stores arithmetic results calculated by the arithmetic processing portion 111; a memory circuit which stores image data input to the image processing device 101; or the like.

The control portion 113 includes a circuit for controlling the circuit of the image processing device 101. For example, the control portion 113 includes a writing control circuit which controls writing of data in the data storage portion 112, a reading control circuit which controls reading of the data, and the like.

The input side interface portion 114 is a device for exchanging signals with the external device in order to take data such as image data from an external device connected to the image processing device 101 into the image processing device 101. For example, in order to process image data in the image processing device 101, the image data needs to be digital data. Therefore, when the image data is analog data, the input side interface portion 114 may be provided with an analog-digital converter circuit (an A-D converter circuit). The external device is a device that outputs image data, for example, a photographic device such as a camera, or an image reproducing device for reproducing image data recorded in a storage medium such as a hard disc or a DVD.

The output side interface portion 115 is a device for exchanging signals with the image output device 102 in order to output the image data to the image output device 102. For example, the output side interface portion 115 is provided with a digital-analog converter circuit (a D-A converter circuit) in order to output an analog image signal to the image output device 102.

The image output device 102 having a function of displaying moving images can be formed using, for example, a liquid crystal display device, an electroluminescence display device, a field emission display, a plasma display, or the like. FIG. 1 illustrates an example of the structure of the image output device 102. As illustrated in FIG. 1, the image output device 102 includes a display portion 121 including a plurality of pixels 120, a scan line driver circuit 122, a signal line driver circuit 123, and the like. In the display portion 121, the pixels 120 are arranged in M rows and N columns (each of M and N is a natural number). A scan line 125 and a signal line 126 are electrically connected to each pixel 120. Accordingly, each pixel 120 is electrically connected to the scan line driver circuit 122 and the signal line driver circuit 123.

A luminance value (also referred to as a gray level or a concentration level) of each pixel 120 in the display portion 121 is determined by the image data input from the image processing device 101. A signal for selecting the pixel 120 that is to perform display is input to the scan line 125 from the scan line driver circuit 122, and image data is input to the signal line 126 from the signal line driver circuit 123. The image data is input to the pixel 120 which is selected via the signal line 126, and the pixel 120 displays a tone determined by this image data.

Note that the image processing system 100 of FIG. 1 is an image display system in which the image output device 102 is a display device of a moving image; however, an embodiment mode of the present invention is not limited to the image display system. For example, the image output device 102 is formed using a moving image storage device provided with a storage medium for storing data of a moving image such as a hard disk, whereby the image processing system of this embodiment mode can be used as an image data storage system.

Figure 2:
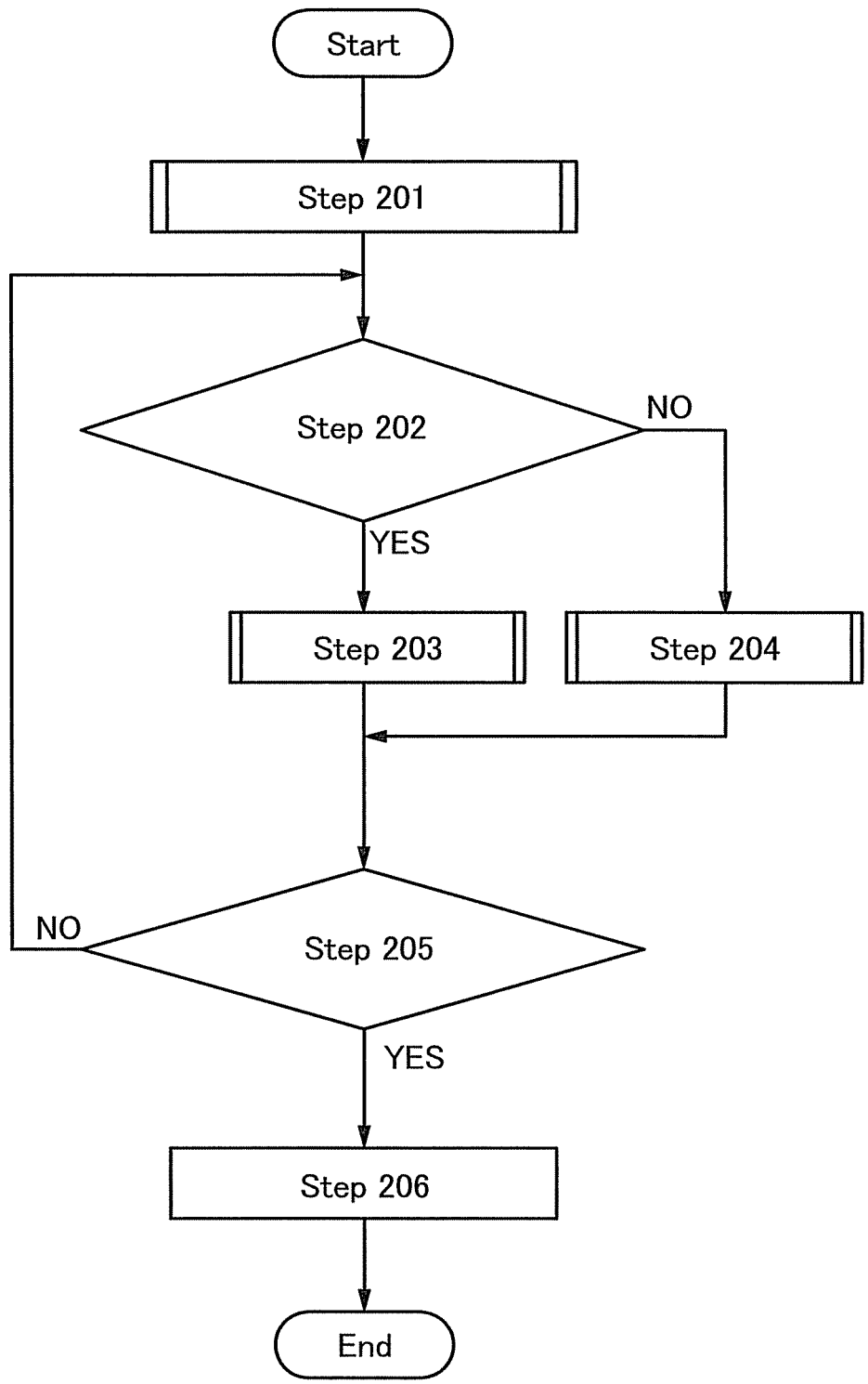
FIG. 2 is a flow chart illustrating an example of an image processing which corrects a moving image.

Next, an image processing method that the image processing device 101 executes is described with reference to FIG. 2. FIG. 2 is a flow chart of the image processing method of this embodiment mode.

In a plurality of frame images generating a moving image, there is a portion where an image is changed in two consecutive frame images. In this specification, in a frame image, an image in which change in motion is equal to or more than a given threshold (or larger than the given threshold) is referred to as a moving object, and an image of the other portion is referred to as a background. That is, the background is an image which has no change in motion or has a change in motion lower than the given threshold (or equal to or less than the given threshold). In addition, in a frame image, a plurality of pixels (a pixel group) that generates a moving object is referred to as a "moving object region", and a plurality of pixels (a pixel group) that generates a background is referred to as a "background region". That is, the background region is a region other than the moving object region in the frame image, and a region including a pixel group that does not generate the moving object.

In an image processing method of this embodiment mode, an image (a moving object) of which change in motion is equal to or more than a given threshold is extracted from a frame image, and the frame image is divided into a moving object region and a background region. Then, a blurring processing (a defocus processing) is performed on the background region, and an image processing by which an effect opposite to that of the blurring processing can be obtained is performed on the moving object region, whereby a correction frame image is generated. In other words, the image processing on the moving object region is an image processing for realizing a state in which a subject is precisely in focus, and is an image processing which has an effect of becoming a clear image, sharpening an image, emphasizing an image, or the like.

In the image processing device 101, a blurring processing is performed on a background region of at least one frame image of a plurality of frame images which is input, and a corrected frame image (hereinafter referred to as a "correction frame image") is generated. FIG. 2 illustrates a flow in which a correction frame image is generated in the image processing device 101. FIG. 2 is also a flow chart of a computer program that the image processing device 101 executes. In the case where it is necessary to distinguish a frame image which should generate a correction frame image from another frame image, this frame image is referred to as a "target frame image" hereinafter.

First, in the image processing device 101, a moving object is extracted from a target frame image (Step 201). This processing is referred to as a "moving object extraction processing". This moving object extraction processing is also a background extraction processing because a moving object is extracted from the target frame image and a background is also extracted. Therefore, the target frame image is divided into a moving object region and a background region by the moving object extraction processing.

Next, in the image processing device 101, whether each pixel in the target frame image is a pixel in the moving object region is determined (Step 202). Then, when a determination result is that a pixel is in the moving object region, the moving object image processing is performed on the pixel (Step 203). When a determination result is that a pixel is not in the moving object region, that is, when the determination result is that a pixel is in the background region, the background image processing is performed (Step 204). The moving object image processing is a processing for correcting the luminance value of the pixel so as to be a luminance value that is suitable for display of the moving object. The background image processing is a blurring processing. The luminance value of the pixel is corrected by the background image processing so as to be a luminance value that is suitable for display of the background. Further, in this embodiment mode, a blurring processing is performed on the pixel of the background region so that blurring is emphasized as the ratio of the moving object in the target frame image is high.

Next, whether a processing is performed on all pixels of the target frame image is determined (Step 205), whereby Step 202 and Step 203 are repeatedly executed. Either of the moving object image processing or the background image process is executed on all pixels of the target frame image, whereby a correction frame image with respect to the target frame image is generated, and an image processing which generates the correction frame image is terminated (Step 206).

At least one kind of an image processing that has an effect of becoming a clear image, emphasizing an image, or the like is executed in the moving object image processing executed in Step 203. Examples of such an image processing are a contrast conversion processing (a contrast enhancement processing) that enhances contrast, a sharpening processing, an unsharp masking processing, an edge enhancement processing, and the like.

The background image processing executed in Step 204 is a blurring processing. By blurring the background, an effect is produced such that a person who watches a moving image has a sense that a moving object is in focus. Examples of the blurring processing are an averaging processing, a contrast conversion processing for reducing contrast, a noise removal processing, and a mosaic processing. That is, a blurring processing executed as the background image processing is an image processing that has an effect of suppressing the amount of information obtained from an image, such as blurring of the outline of the image or dilution of color. At least one kind of an image processing that has a blurring effect is executed in Step 204.

In Step 204, a processing such that the blurring effect on the background region is emphasized is executed as the ratio of the moving object region in the target image is high. That is, as the moving object is larger, the degree of blurring of the background increases. When a moving image in which a character approaches on foot is taken as an example, the image of the character that is a moving object increases; therefore, the background is blurred as the character approaches. Accordingly, since information obtained from the background is suppressed as the character approaches, a person who watches this moving image is naturally made to feel that the character is in focus. That is, the person feels that the moving image is an image with great senses of distance and depth. In addition, since the image of the character becomes clear by the moving object image processing in Step 203, feeling that a portion in motion is in focus can be naturally given to a person who watches a moving image.

In the image processing device 101, a processing of Step 201 to Step 206 is sequentially executed on the plurality of frame images generating a moving image, whereby a plurality of correction frame images is generated. Each correction frame image is output from the image processing device 101 to the image output device 102. In the image output device 102, the moving image including the plurality of correction frame images is displayed on the display portion 121. In the image processing device 101, a processing that is very close to human eye focusing is performed in the image processing in advance; therefore, a person who watches the display portion 121 can watch a moving image with an improved senses of depth and distance.

The image processing device 101 that executes an image processing serves as a moving object extraction portion which extracts a moving object from a target frame image in accordance with the flow of FIG. 2, and also serves as a correction frame image generation portion which processes the target frame image to generate a correction frame image. In addition, a computer program by which an image processing illustrated in the flow of FIG. 2 is executed by the image processing device 101 is stored in the data storage portion 112.

In this embodiment mode, a variety of methods for extracting a moving object can be applied to the moving object extraction processing. Since an arithmetic processing can be easily performed, it is preferable to use a method by which three consecutive frame images are used and a moving object is extracted based on a difference of two adjacent frame images for this processing. Note that to calculate a difference of two images refers to calculating an absolute value of a difference of luminance values of a pixel in the same location of the two images; a difference image refers to an image in which an absolute value of a difference of this luminance value is a luminance value of each pixel.

Figure 3:
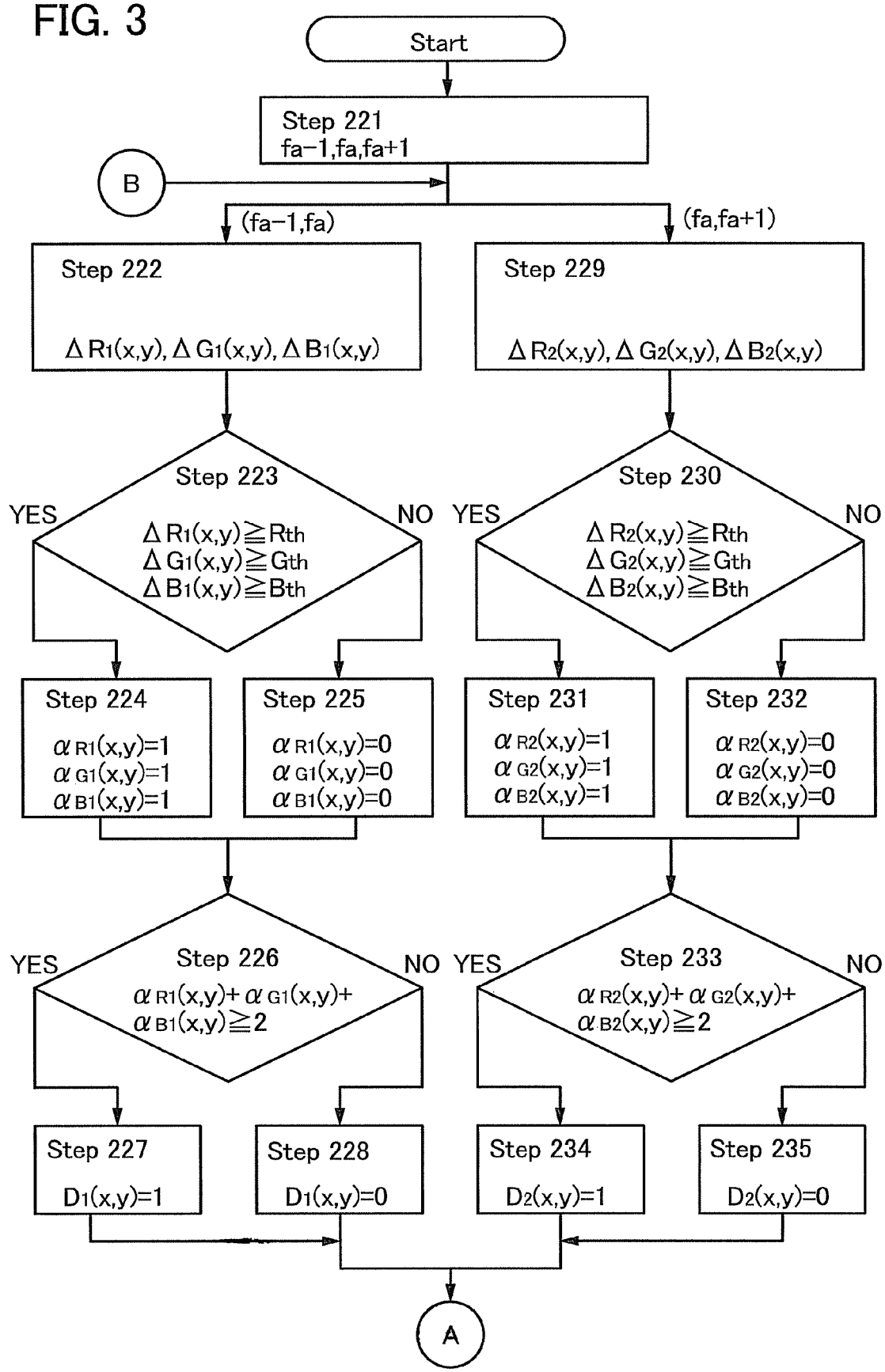
FIG. 3 is a flow chart illustrating an example of a moving object extraction processing.
Figure 4:
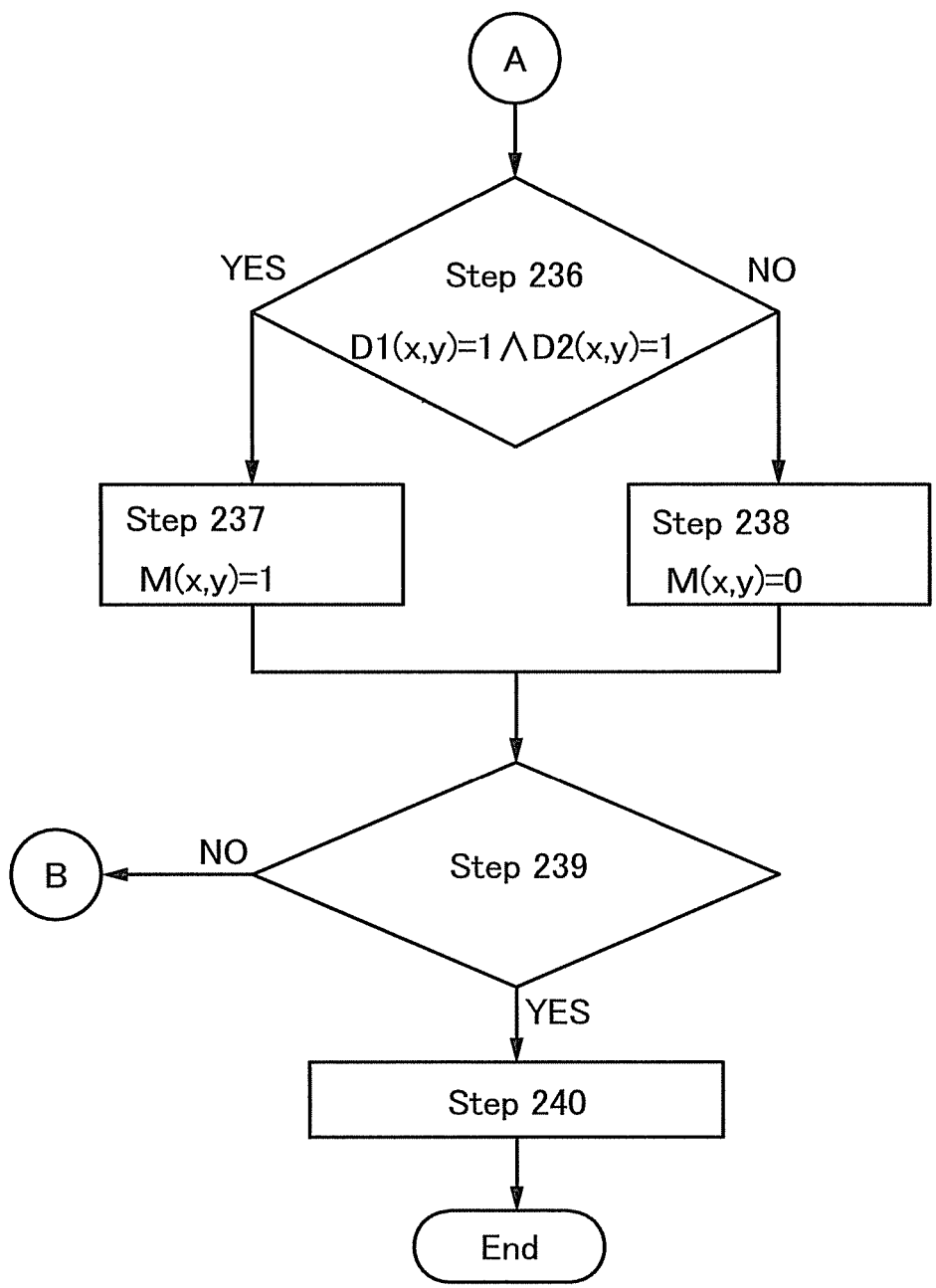
FIG. 4 is a flow chart illustrating an example of a moving object extraction processing.

In this embodiment mode, a mask image ma that masks a moving object region is generated from a difference between three temporally consecutive frame images fa−1, fa, and fa+1 in order that a moving object is extracted from the target frame image fa. This mask image ma is a binary image including a white image and a black image, and the white image and the black image express the division between a moving object region and a background region in the target frame image fa. The moving object extraction processing is described with reference to FIG. 3 and FIG. 4. FIG. 3 and FIG. 4 are flow charts that illustrate an example of the moving object extraction processing. The description of Step 221 to Step 235 refers to FIG. 3, and the description of Step 236 to Step 240 refers to FIG. 4.

First, the image processing device 101 reads the three frame images fa−1, fa, and fa+1 (Step 221). The data of the read frame images fa−1, fa, and fa+1 is written in the data storage portion 112. The frame image fa is the target frame image. Note that three frame images to be subjected to a processing are not limited to the images which are immediately before and immediately after the target frame image fa. That is, the target frame image fa, a frame image which is k frame (k is natural number) before the target frame image fa, and a frame image which is k frame after the target frame image fa can be used. For example, the target frame image fa, and frame images fa−2 and fa+2 which are two frames before and after the target frame image fa may be used. In addition, k may be greater than or equal to 3 in the case of a moving image or the like in which a background changes little, like a moving image taken with a fixed camera. In consideration of photography conditions of a moving image, a value of k can be set by a practitioner, as appropriate. Note that in terms of image processing speed, a frame image which is one frame or two frames before the target frame image and a frame image which is one frame or two frames after the target frame image are preferably used for the moving object extraction processing.

The arithmetic processing portion 111 of the image processing device 101 calculates a difference between a pixel (x, y) of the target frame image fa and a pixel (x, y) of the frame image fa−1 (Step 222). Here, the pixel (x, y) is set as a minimum unit of an image. In addition, data (a pixel value) of the pixel (x, y) includes luminance values (gradation values) of three colors of red, green, and blue (RGB). Accordingly, when Step 222 is executed, three difference values, $\Delta R_1$ (x, y), $\Delta G_1$ (x, y), and $\Delta B_1$ (x, y), are calculated in accordance with the luminance values of RGB. The difference values, $\Delta R_1$ (x, y), $\Delta G_1$ (x, y), and $\Delta B_1$ (x, y), are stored in the data storage portion 112 in the image processing device 101. Note that the color element of the pixel (x, y) may be color other than RGB, and for example, yellow, cyan, and magenta may be used.

Next, the arithmetic processing portion 111 determines whether the difference values, $\Delta R_1$ (x, y), $\Delta G_1$ (x, y), and $\Delta B_1$ (x, y), are equal to or more than thresholds, $R_{th}$, $G_{th}$, and $B_{th}$, respectively (Step 223). If the difference values are equal to or more than the thresholds, luminance determination values are set to 1 (Step 224). On the other hand, if the difference values are less than the thresholds, luminance determination values are set to 0 (Step 225). That is, in the case where $\Delta R_1$ (x, y)≥$R_{th}$, a red luminance determination value $\alpha_{R1}$ (x, y) equals 1, and in the case where $\Delta R_1$ (x, y)<$R_{th}$, the red luminance determination value $\alpha_{R1}$ (x, y) equals 0. This is also applied to green and blue. Depending on the fact whether the difference values $\Delta G_1$ (x, y) and $\Delta B_1$ (x, y) are equal to or more than the thresholds $G_{th}$ and $B_{th}$, or less than the thresholds thereof, the luminance determination values $\alpha_{G1}$ (x, y) and $\alpha_{B1}$ (x, y) are determined as "1" or "0". Here, variation of luminance values between two frame images is used for the determination whether or not the image is a moving object. The thresholds ($R_{th}$, $G_{th}$, and $B_{th}$) are thresholds of variation of luminance values to determine whether a pixel is included in the moving object or in the background, and correspond to the threshold of variation in motion. The determined luminance determination values $\alpha_{R1}$ (x, y), $\alpha_{G1}$ (x, y), and $\alpha_{B1}$ (x, y) are stored in the data storage portion 112 in the image processing device 101.

Next, the arithmetic processing portion 111 determines whether the sum of the luminance determination values of RGB are equal to or more than 2 or not (Step 226). If $\alpha_{R1}$ (x, y)+$\alpha_{G1}$ (x, y)+$\alpha_{B1}$ (x, y)≥2, a difference determination value $D_1$ (x, y) of the pixel (x, y) is set to 1 (Step 227). If $\alpha_{R1}$ (x, y)+$\alpha_{G1}$ (x, y)+$\alpha_{B1}$ (x, y)<2, the difference determination value $D_1$ (x, y) is set to 0 (Step 228). The difference determination value $D_1$ (x, y) is stored in the data storage portion 112 in the image processing device 101.

The difference determination value $D_1$ (x, y) corresponds to a luminance value of a pixel (x, y) of an image in which a difference image of two frame images fa and fa−1 is binarized. That is, the equation $D_1$ (x, y)=1 indicates that the pixel (x, y) of this binarized difference image displays white, and $D_1$ (x, y)=0 indicates that the pixel (x, y) displays black. Here, as for the pixel (x, y) which has no change in luminance value or has small amount of change between the frame image fa−1 and the target frame image fa, $D_1$ (x, y) equals 1, and as for the pixel (x, y) in which the amount of change is equal to or more than the threshold, $D_1$ (x, y) equals 0.

Step 222 to Step 228 can be said to be the processing in which the difference of the luminance values of RGB of the pixel (x, y) is subjected to a decision-by-majority processing and the luminance value of the pixel (x, y) is set to black or white. Step 222 to Step 228 are performed on all pixels, whereby a binary image of the difference image of the frame image fa and the frame image fa−1 can be obtained. Here, the white image (a pixel group which has a luminance value of 1) of this binarized difference image becomes a region in which a moving object region of the frame image fa and a moving object region of the frame image fa−1 are put together.

Step 222 to Step 228 are a processing in which the arithmetic processing portion 111 calculates difference data of the pixel (x, y) of the target frame image fa and the pixel (x, y) of the frame image fa−1, and the difference determination value $D_1$ (x, y) is obtained from this difference data. A processing, similar to this processing of Step 222 to Step 228, is executed on the pixel (x, y) of the target frame image fa and the pixel (x, y) of the frame image fa+1 in the arithmetic processing portion 111 (Step 229 to Step 235). Note that as illustrated in FIG. 3, "2" is added to symbols of data calculated in Step 229 to Step 235 to distinguish these symbols from those of data calculated in Step 222 to Step 228.

Accordingly, Step 229 to Step 235 are performed on all pixels, whereby a binary image of a difference image of the frame image fa and the frame image fa+1 can be obtained. Here, the white image (a pixel group which has a luminance value of 1) of this binary difference image becomes a region in which the moving object region of the frame image fa and a moving object region of the frame image fa+1 are put together.

Next, the arithmetic processing portion 111 determines whether both two difference determination values $D_1$ (x, y) and $D_2$ (x, y) are "1" or not (Step 236). When both the two luminance determination values $D_1$ (x, y) and $D_2$ (x, y) are "1", a moving object determination value M (x, y) is set at "1"

(Step 237); when at least one of the two luminance determination values $D_1(x, y)$ and $D_2(x, y)$ is not "1", the moving object determination value M (x, y) is set at "0" (Step 238). That is, in Step 236, AND operation (AND) of $D_1(x, y)=1$ and $D_2(x, y)=1$ is calculated. If the result of this AND operation is "true", M (x, y) equals 1 (Step 237); if this result is "false", M (x, y) equals 0 (Step 238).

The moving object determination value M (x, y) indicates the luminance value of the pixel (x, y) of the mask image ma. That is, in the case where M (x, y)=1, the pixel (x, y) of the mask image ma displays white, and in the case where M (x, y)=0, this pixel (x, y) displays black.

Next, it is determined whether the calculation of the moving object determination value M (x, y) is performed on all pixels (Step 239). In the case where the moving object determination values M (x, y) of all pixels are not determined, a processing returns to Step 222 and Step 229. The moving object determination values M (x, y) of all pixels are calculated, whereby the mask image ma in which the moving object determination value M (x, y) is set as a luminance value is generated, and extraction of the moving object region is terminated (Step 240).

In the mask image ma, a region (a pixel group which displays white) where the moving object determination value M (x, y) equals 1 is a moving object region of the target frame image fa, while a region (a pixel group which displays black) where the moving object determination value M (x, y) equals 0 is a background region of the target frame image fa. That is, the mask image ma is a binary image including the moving object region and the background region, and the mask image ma is generated, whereby the target frame image fa is divided into the moving object region and the region (background region) that is not included in the moving object region.

The mask image ma generated in the moving object extraction processing illustrated in FIG. 3 and FIG. 4 can be said as a binary image that is generated by calculating an AND operation (AND) of an image in which the difference image of the frame image fa and the frame image fa−1 are binarized and an image in which the difference image of the frame image fa and the frame image fa+1 are binarized.

Here, the image processing device 101 is a moving object extraction portion in which the moving object extraction processing illustrated in FIG. 3 and FIG. 4 is executed and the moving object is extracted from the target frame image, and is a mask image generation portion that generates a mask image including the moving object region and the background region.

In order to extract the moving object from the target frame image more precisely, an image processing may be performed on three frame images used in the moving object extraction processing, and then the mask image ma may be generated in the image processing device 101. Examples of such an image processing are an averaging processing, a filter processing using a linear primary differential filter in a horizontal direction, an edge detection processing, and a noise removal processing using a median filter or the like.

By the flow of the moving object extraction processing of FIG. 3, a condition by which the difference determination values $D_1(x, y)$ and $D_2(x, y)$ are determined is set such that the sum of the luminance determination values of RGB is set at equal to or more than 2 in Step 226 and Step 233; however, a condition that the sum is set at equal to or more than 1 or a condition that the sum is set at equal to or more than 3 may be used.

Figure 5:
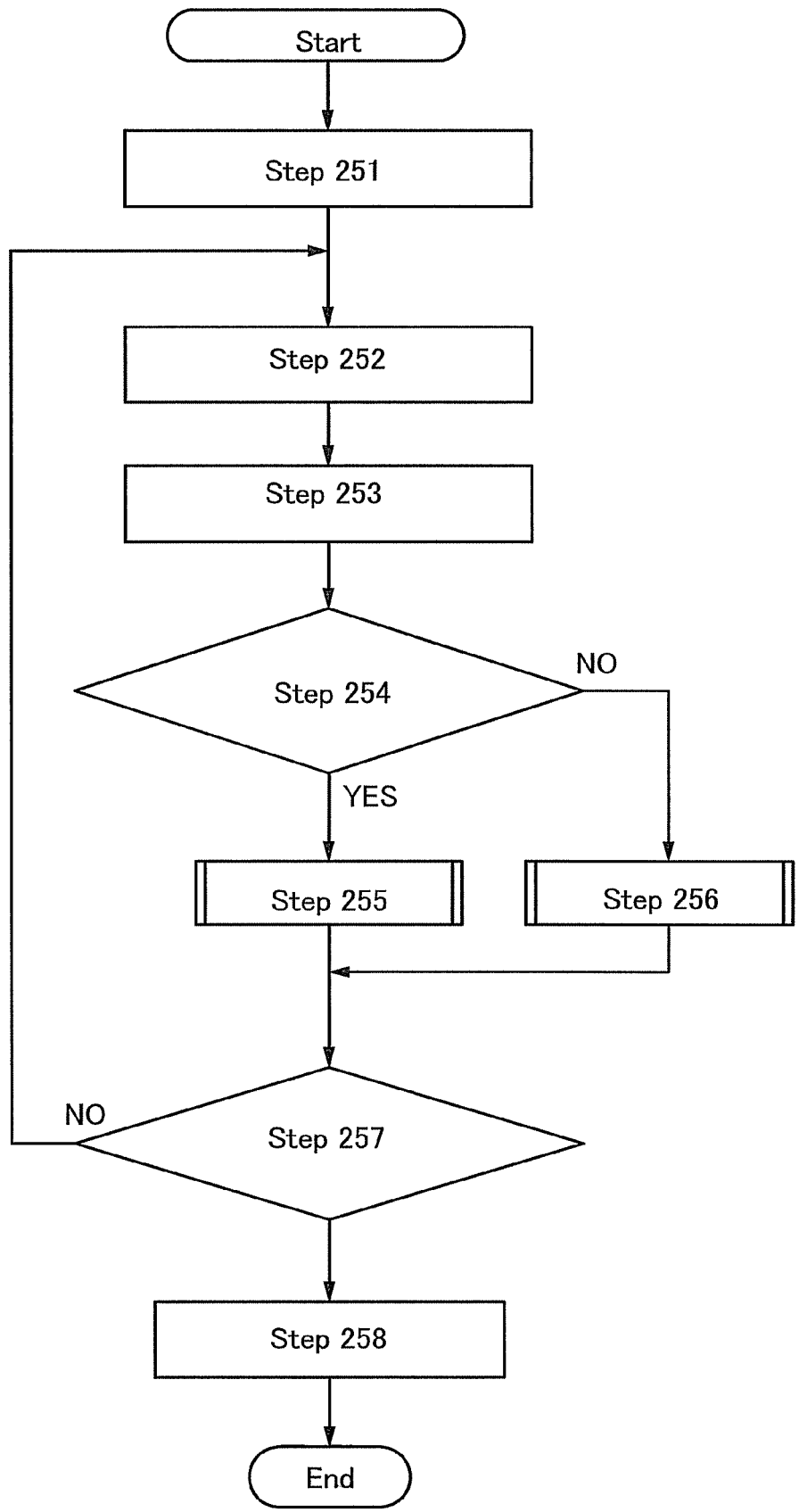
FIG. 5 is a flow chart illustrating an example of a mask processing.

Next, a method is described in which whether the pixel of the target frame image fa is the pixel of the moving object region or the pixel of the background region is determined by using the mask image ma, and based on the determination, the target frame image fa is corrected to generate a correction frame image. Here, this processing is referred to as a "mask processing". In the flow of FIG. 2, a processing from Step 201 to Step 206 corresponds to the mask processing. The mask processing is described with reference to FIG. 5. FIG. 5 is a flow chart of the mask processing of this embodiment mode.

First, in the mask processing, a ratio Pm (hereinafter referred to as a "ratio Pm of the moving object region") of the moving object region in the target frame image fa is calculated (Step 251). This ratio Pm of the moving object region is equal to a ratio of a white display region (a pixel group where the moving object determination value is M (x, y)=1, and a region where luminance value=1) of the mask image ma in the mask image ma. Here, the ratio of the moving object region is calculated from a ratio of the number of pixels in which luminance value equals 1 with respect to the number of all pixels of the mask image ma (the moving object determination value M (x, y)=1). The calculated ratio Pm of the moving object region is stored in the data storage portion 112 in the image processing device 101.

Here, a calculation processing of the ratio Pm of the moving object region is one processing of the mask processing; however, the ratio Pm of the moving object region may be calculated in the moving object extraction processing. In this case, the number of pixels in which M (x, y) equals 1 is counted every time of executing Step 237, whereby Step 239 is completed. Accordingly, the ratio Pm can be calculated from the number of pixels.

Next, the luminance value of the pixel (x, y) of the target frame image fa is read in the arithmetic processing portion 111 (Step 252). The luminance value of the pixel (x, y) of the mask image ma is read in the arithmetic processing portion 111 (Step 253), and it is determined whether the luminance value is 1 (Step 254). The luminance value of the pixel (x, y) of the mask image ma corresponds to the moving object determination value M (x, y) and has a value of "1" or "0". When the pixel (x, y) of the mask image ma has a luminance value of 1, the pixel (x, y) of the target frame image fa is subjected to the moving object image processing, and the luminance value is corrected (Step 255). When the luminance value of the pixel (x, y) of the mask image ma is not 1 (luminance value=0), the pixel (x, y) of the target frame image fa is subjected to the background image processing, and the luminance value is corrected (Step 256). The luminance value determined in Step 255 and Step 256 is a luminance value of a pixel (x, y) of a correction frame image Fa. This luminance value is stored in a memory circuit for a correction frame image in the data storage portion 112.

Next, all pixels of the target frame image fa are determined whether a processing of Step 255 or Step 256 is performed (Step 257). When a processing on all pixels is not terminated, Step 252 to Step 257 are repeatedly executed. The luminance values of all pixels are calculated, whereby the correction frame image Fa is generated (Step 258), and a mask processing is terminated.

That is, the image processing device 101 is a device that generates the correction frame image Fa, and includes a mask image generation portion that generates the mask image ma and a correction frame image generation portion that generates the correction frame image Fa.

In the background image processing of Step 256, a blurring processing is executed so that the blurring effect becomes strong as the ratio Pm of the moving object region which is calculated in Step 251 is high. In this embodiment mode, the blurring processing is set in 6 stages from level 0 to level 5. The level 5 has the highest blurring effect, and the level 0 has the lowest blurring effect. In this embodiment mode, a blurring processing at level 0 is a processing in which a blurring processing is not executed and the luminance value of the pixel is not corrected.

Figure 6:
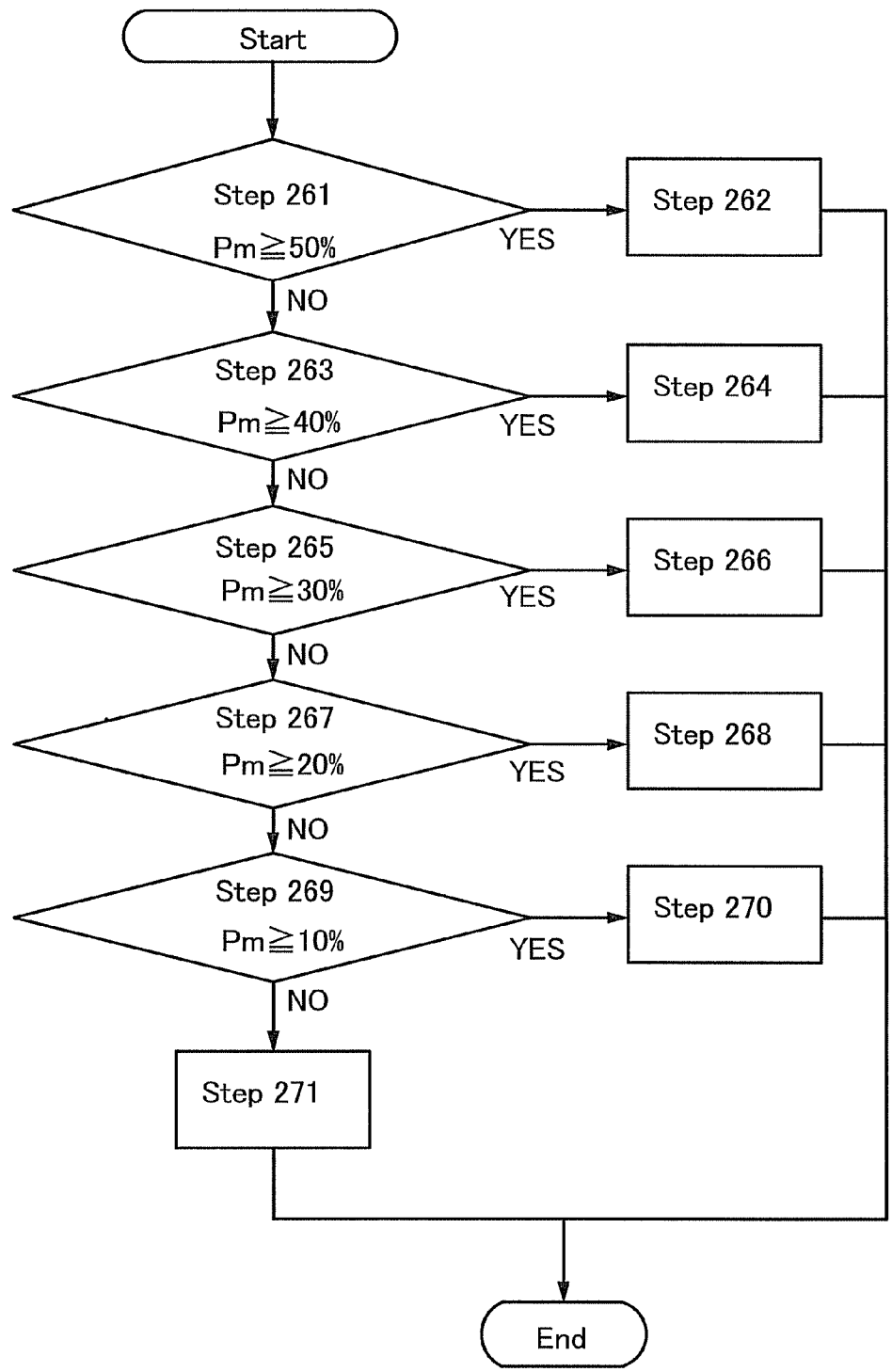
FIG. 6 is a flow chart illustrating an example of a background image processing.

In this embodiment mode, the ratio Pm of the moving object region is divided into six ranges: equal to or more than 50% and equal to or less than 100%, equal to or more than 40% and less than 50%, equal to or more than 30% and less than 40%, equal to or more than 20% and less than 30%, equal to or more than 10% and less than 20%, and equal to or more than 0% and less than 10%. A blurring processing from level 5 to level 0 is performed in accordance with the ratio Pm of the moving object region. The background image processing is described with reference to FIG. 6. FIG. 6 is a flow chart of the background image processing of this embodiment mode.

It is determined whether the ratio Pm of the moving object region calculated in Step 251 is equal to or more than 50% (Step 261). If Pm ≥50%, the blurring processing at level 5 is performed (Step 262). If Pm <50%, it is determined whether the ratio Pm is equal to or more than 40% (Step 263). If a determination result of Step 263 is Pm ≥40%, a blurring processing at level 4 is performed (Step 264), and if this determination result is Pm <40%, it is determined whether the ratio Pm is equal to or more than 30% (Step 265). If a determination result of Step 265 is Pm ≥30%, a blurring processing at level 3 is performed (Step 266), and if this determination result is Pm <30%, it is determined whether the ratio Pm is equal to or more than 20% (Step 267). If a determination result of Step 267 is Pm ≥20%, a blurring processing at level 2 is performed (Step 268), and if this determination result is Pm <20%, it is determined whether the ratio Pm is equal to or more than 10% (Step 269). If a determination result of Step 269 is Pm ≥10%, a blurring processing at level 1 is performed (Step 270), and if this determination result is Pm <10%, a blurring processing at level 0 is performed (Step 271). Here, a blurring processing at level 0 is a processing in which the luminance value of the pixel (x, y) is not corrected; therefore, the luminance value of the pixel (x, y) before correction becomes a luminance value after correction.

As illustrated in the flow chart of FIG. 6, a blurring processing at any of level 5 to level 0 is executed on the pixel (x, y) included in the background region in accordance with the ratio Pm of the moving object region, and the background image processing is terminated.

In the flow chart of FIG. 6, the blurring processing has six levels; however, there is no limitation on the number of levels, and it is acceptable as long as the blurring processing has equal to or more than two levels. In addition, a condition to set the level of a blurring processing is not limited to the flow chart of FIG. 6, and a practitioner can set the condition, as appropriate. That is, a gradual change in levels of a blurring processing may be made so that the blurring effect becomes strong as the ratio Pm of the moving object region is high.

Next, a method for performing a blurring processing that has a different level is described as the blurring processing, by taking the case where an averaging processing is performed as an example.

In the averaging processing, by using the blurring processing of which effect is emphasized by increasing the number of pixels that are used to calculate the average value of luminance, the level of a blurring processing can be set. In this case, an averaging processing of the pixel is not performed at level 0, for example. In an averaging processing at level 1, the average luminance value of 9 pixels arranged in 3 rows and 3 columns centered on a pixel to be an object is a luminance value of a pixel after correction. At level 2, a pixel group in which an average luminance value is calculated is a pixel group in which 25 pixels are arranged in 5 rows and 5 columns centered on a pixel to be an object. At level 3, a pixel group is used in which 49 pixels are arranged in 7 rows and 7 columns; at level 4, a pixel group is used in which 81 pixels are arranged in 9 rows and 9 columns; and at level 5, a pixel group is used in which 121 pixels are arranged in 11 rows and 11 columns.

Alternatively, by using the blurring processing of which effect is emphasized by increasing the number of times of an averaging processing, the level of a blurring processing can be set. For example, at level 0, an averaging processing is not performed on a pixel. In the averaging processing at level 1, an average luminance value of 9 pixels arranged in 3 rows and 3 columns centered on the pixel to be an object is a pixel value after correction. At level 2, an averaging processing at level 1 is performed two times. That is, in the first averaging processing, the average luminance value of 9 pixels arranged in 3 rows and 3 columns centered on the pixel to be an object is calculated. In the second averaging processing, the average luminance value of the same 9 pixels is also calculated. Note that the average value calculated in the first averaging processing is used for the luminance value of the pixel to be an object. The average value calculated in the second averaging processing is the luminance value of the pixel calculated in the blurring processing at level 2. The averaging processing at levels 3 to 5 is similar to the averaging processing at level 2, and the averaging processing at level 3, level 4, and level 5 is performed three times, four times, and five times, respectively.

The blurring processing at different levels can be performed even in a median filter processing, a contrast conversion processing that weakens contrast, and a mosaic processing, in a similar manner to the averaging processing.

Next, the image processing of FIG. 2 is concretely described using an image. FIGS. 7A and 7B are diagrams illustrating an image processing method of this embodiment mode. FIG. 7A illustrates six frame images 300 to 305 before correction, and FIG. 7B illustrates correction frame images 310 to 315 in which an image processing is performed on the frame images 300 to 305. Here, as illustrated in FIG. 7A, a moving image in which a character approaches from afar between two trees is set as a moving image which is subjected to an image processing. However, the frame images 300 to 305 illustrated in FIG. 7A are not temporally adjacent.

The image processing of this embodiment mode is executed, whereby a moving object image processing is executed for the character which is a moving object. Therefore, the image of the character becomes clear or is emphasized (see FIG. 7B). On the other hand, corresponding to the ratio of the image of the character in the frame image in accordance with the flow chart of FIG. 6, the blurring processing which has a different level of blurring is executed on the image of the background other than the character. In the case of the moving image of FIG. 7A, the area of the character in the frame image increases as the character approaches; therefore, the background of the frame image is blurred as time passes. A blurring processing at levels 0 to 5 is performed on each background region of the correction frame images 310 to 315 illustrated in FIG. 7B.

As illustrated in FIG. 7B, the image processing of this embodiment mode is performed, whereby the background is blurred as the character approaches. As a result, because the amount of information obtained from the background is gradually decreased, a person who watches this moving image is naturally made to feel that the character is in focus as the character approaches from afar.

As described above, as the ratio of the moving object region in the frame image is high, a moving image which has a high realistic sense (senses of distance and depth) can be generated by performing an image processing that emphasizes the blurring effect on the background region. That is, in this embodiment mode, the blurring effect for the background of each frame image is changed in accordance with the motion of the image, whereby a processing that is very close to human eye focusing when a person watches a thing is performed in the image processing in advance. Therefore, even if a moving image is displayed on a two-dimensional display, a moving image by which a person can feel senses of distance and depth can be generated.

(Embodiment Mode 2)

Like a surveillance camera, a camera is fixed and a moving image is photographed under the same focus conditions, whereby a moving image without a change of a background is photographed. Such a moving image is a moving image including the plurality of frame images illustrated in FIG. 7A, for example. In this embodiment mode, a method for extracting a moving object from such a moving image is described.

In this embodiment mode, instead of using three frame images, a frame image (hereinafter referred to as a "frame image for background") in which there is no moving object and which is only a background is prepared. A difference image of the frame image for background and the target frame image is generated, and an image in which this difference image is binarized serves as the mask image ma.

To generate the mask image ma, difference values ($\Delta R_1$ (x, y), $\Delta G_1$ (x, y), and $\Delta B_1$ (x, y)) of the luminance of the pixel (x, y) are calculated. The luminance determination values ($\alpha_{R1}$ (x, y), $\alpha_{G1}$ (x, y), and $\alpha_{B1}$ (x, y)) are set at "0" or "1" whether the difference value is equal to or more than a threshold or less than the threshold. The flow up to this point is the same from Step 222 to Step 225 of FIG. 3.

Then, if $\alpha_{R1}$ (x, y)+$\alpha_{G1}$ (x, y)+$\alpha_{B1}$ (x, y)≥2, the moving object determination value M (x, y) of this pixel equals 1. If $\alpha_{R1}$ (x, y)+$\alpha_{G1}$ (x, y)+$\alpha_{B1}$ (x, y)<2, the moving object determination value M (x, y) of this pixel equals 0. The moving object determination values M (x, y) of all pixels are determined, whereby the mask image ma is generated in a similar manner to Embodiment Mode 1.

(Embodiment Mode 3)

When an image processing is performed on both the background region and the moving object region, the effect of the image processing on the moving object region may be changed in accordance with the ratio of the moving object region in the frame image. That is, in the moving object image processing, the image processing that has a different level is performed on the moving object region in accordance with the ratio Pm of the moving object region, in a similar manner to the background image processing of FIG. 6. In this case, a gradual change in levels of an image processing (a sharpening processing, a contrast enhancement processing, and the like) which is executed in the moving object image processing may be made so that sharpening of an image or the effect of emphasis is increased as the ratio Pm of the moving object region is high.

(Embodiment Mode 4)

In this embodiment mode, the image output device 102 in FIG. 1 is described.

Figure 8A:
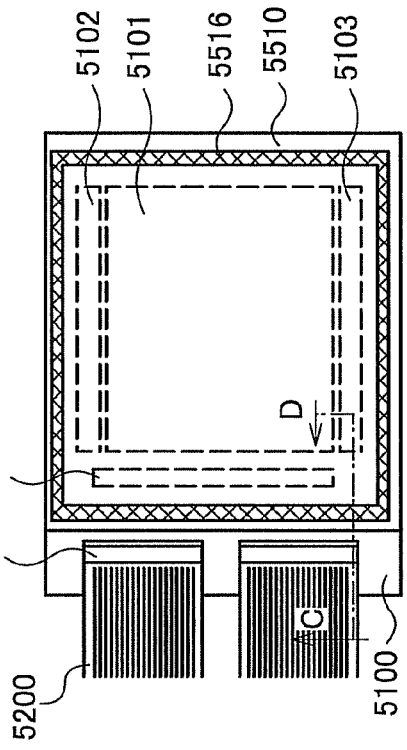
FIGS. 8A and 8B illustrate a structural example of an image output device.
Figure 8B:
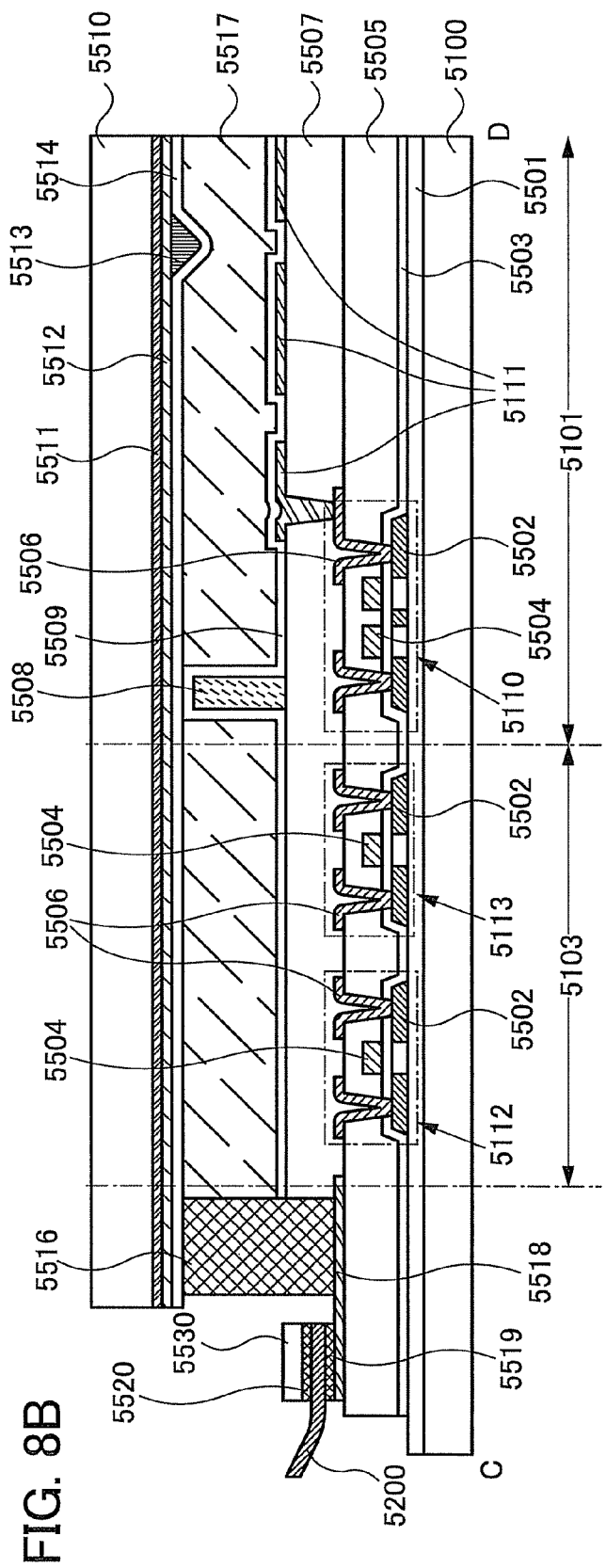

FIGS. 8A and 8B illustrate a structural example of a liquid crystal display device used for the image output device 102. FIG. 8A is a top view of the liquid crystal display device of this embodiment mode. FIG. 8B is a cross-sectional view taken along cutting plane line C-D in FIG. 8A. The liquid crystal display device of this embodiment mode has a substrate provided with a circuit using transistors, a substrate facing this substrate, and a liquid crystal layer sandwiched between these two substrates. In the liquid crystal display device of this embodiment mode, a circuit includes top-gate transistors using a crystalline semiconductor film. In addition, a multi-domain vertical alignment (MVA) mode is used as its display mode.

As illustrated in FIG. 8A, a pixel portion 5101, a first scan line driver circuit 5102, a second scan line driver circuit 5103, and a signal line driver circuit 5104 are formed over a substrate 5100. The pixel portion 5101 has a plurality of pixels. Each pixel is provided with a pixel electrode and a transistor that is electrically connected to the pixel electrode. In addition, the first scan line driver circuit 5102, the second scan line driver circuit 5103, and the signal line driver circuit 5104 are formed using a plurality of semiconductor elements such as a plurality of transistors.

The pixel portion 5101, the first scan line driver circuit 5102, the second scan line driver circuit 5103, and the signal line driver circuit 5104 are sealed between the substrate 5100 and a substrate 5510 with a sealant 5516. In addition, an FPC 5200 and an IC chip 5530 are provided over the substrate 5100 by a TAB method. A signal output from the image processing device 101 to the image output device 102 is input to the FPC 5200.

A cross-sectional structure taken alone cutting plane line C-D in FIG. 8A is described with reference to FIG. 8B. For convenience of description, in FIG. 8B, one transistor 5110 and part of a pixel electrode 5111 are illustrated as a cross-sectional structure of the pixel portion 5101, and two transistors 5112 and 5113 are illustrated as a cross-sectional structure of the second scan line driver circuit 5103.

Over the substrate 5100, an insulating film 5501 that has a single-layer structure or a stacked structure is formed as a base film. As the insulating film 5501, a silicon oxide film, a silicon nitride film, a silicon nitride oxide film, a silicon oxynitride film, or the like is formed. Here, silicon nitride oxide is a material that contains more nitrogen than oxygen, while silicon oxynitride is a material that contains more oxygen than nitrogen. Note that it is preferable that a layer of the insulating film 5501 which comes into contact with a semiconductor film of the transistors 5110, 5112, and 5113 be formed using a silicon oxide film or a silicon oxynitride film. This is because interface state density between the insulating film 5501 and a channel formation region can be reduced. In addition, it is preferable that the insulating film 5501 be provided with at least one film which has a blocking effect against sodium ions, such as a silicon nitride film or a silicon nitride oxide film.

A semiconductor film 5502 having an island shape is formed over the insulating film 5501, and an insulating film 5503 is formed as a gate insulating film over the semiconductor film 5502. The semiconductor film 5502 forms channel formation regions, and source and drain regions of the transistors 5110, 5112, and 5113. The insulating film 5503 is formed using a single-layer film such as a thermal oxide film, a silicon oxide film, a silicon nitride film, or a silicon oxynitride film; or a stacked-layer film of these films. It is preferable that a layer of the insulating film 5503, which comes into contact with the semiconductor film 5502, be a silicon oxide film or a silicon oxynitride film. This is because interface state density between the insulating film 5503 and the semiconductor film 5502 can be reduced.

A conductive film 5504 processed into a predetermined shape is formed over the insulating film 5503. The conductive film 5504 is a film having a single-layer structure or a multi-layer structure, and forms gate electrodes of the transistors 5110, 5112, and 5113, and a scan line of the pixel portion

5101. Here, the transistor 5110 of the pixel portion 5101 has a dual-gate structure to suppress leakage current.

An insulating film 5505 having a single-layer structure or a stacked film structure is formed covering the conductive film 5504. The insulating film 5505 functions as an interlayer film. A film formed using an organic material, which is used for the insulating film 5505 includes a film formed using polyimide, acrylic, polyamide, polyimide amide, resist, benzocyclobutene, a siloxane resin, or the like. In addition, as for a film using an inorganic material, there is a film formed using silicon oxide, silicon nitride, silicon oxynitride, silicon nitride oxides aluminum nitride, aluminum oxide, aluminum oxynitride, aluminum nitride oxide that contains more nitrogen than oxygen, diamond-like carbon (DLC), nitrogen-containing carbon (e.g. CN), phosphosilicate glass (PSG), borophosphosilicate glass (BPSG), or the like.

Contact holes are formed in the insulating film 5503 and the insulating film 5505. The contact holes reach the source and drain regions of the transistors 5110, 5112, and 5113. A conductive film 5506 processed into a predetermined shape is formed over the insulating film 5505. The conductive film 5506 forms source and drain electrodes of the transistors 5110, 5112, and 5113, and a signal line of the pixel portion 5101. The conductive film 5506 has a single-layer structure or a multi-layer structure.

An insulating film 5507 is formed over the insulating film 5505. The insulating film 5507 can be formed in a similar manner to the insulating film 5505. When the insulating film 5507 serves as a planarization film, at least one film including an organic material may be formed for the insulating film 5507, for example. The insulating film 5507 serves as a planarization film, whereby alignment disorder of liquid crystal molecules can be suppressed.

A pixel electrode 5111 is formed over the insulating film 5507. The pixel electrode 5111 is in contact with the conductive film 5506 through a contact hole formed in the insulating film 5507. Accordingly, the pixel electrode 5111 and the transistor 5110 are electrically connected to each other. In addition, the pixel electrode 5111 is provided with an opening portion. By this opening portion, the liquid crystal molecules are aligned so as to be inclined in a state where there is no electric field in the liquid crystal molecules, whereby display by an MVA mode can be performed. Instead of forming the opening portion, the top surface of the pixel electrode 5111 may be provided with a projection portion to align the liquid crystal molecules in this manner.

When a light-transmitting electrode is used for the pixel electrode 5111, the pixel electrode 5111 is formed using a light-transmitting conductive film that transmits light. Examples of the light-transmitting conductive film are an indium tin oxide film formed by mixing indium oxide with tin oxide, an indium tin silicon oxide film formed by mixing indium tin oxide with silicon oxide, an indium zinc oxide film formed by mixing indium oxide with zinc oxide, a zinc oxide film, and a tin oxide film. On the other hand, when a reflective electrode is used for the pixel electrode 5111, the pixel electrode 5111 is formed using a conductive film that reflects light. For example, the pixel electrode 5111 may be formed using a film having a single-layer structure or a stacked structure including a metal such as Ti, Mo, Ta, Cr, W, Al, or the like or an alloy of these.

Over the insulating film 5507, a spacer 5508 is formed in a region that is not overlapped with the pixel electrode 5111. The spacer 5508 is formed using a resin. A gap (space) between the substrate 5100 and the substrate 5510 is maintained by the spacer 5508. A liquid crystal layer 5517 including liquid crystal molecules is formed in this gap. An orientation film 5509 is formed covering the pixel electrode 5111 and the spacer 5508. The orientation film 5509 is formed if necessary.

The substrate 5510 functions as a counter substrate. The substrate 5510 is provided with a counter electrode 5511, a color filter layer 5512, and a projection portion 5513. The counter electrode 5511 can be formed using a light-transmitting conductive film for forming the pixel electrode 5111. With the projection portion 5513, the liquid crystal molecules are aligned so as to be inclined in a state where there is no electric field, whereby display by the MVA mode can be performed. The substrate 5510 is provided with an alignment film 5514 covering the counter electrode 5511 and the projection portion 5513. The alignment film 5514 is formed if necessary.

The sealant 5516 is formed between the substrate 5100 and the substrate 5510 so as to surround the pixel portion 5101, the first scan line driver circuit 5102, the second scan line driver circuit 5103, and the signal line driver circuit 5104. There is the liquid crystal layer 5517 including liquid crystal molecules in the gap between the substrate 5100 and the substrate 5510 sealed by the sealant 5516.

The insulating film 5507 is provided with a plurality of terminals 5518 in a region outside the region surrounded with the sealant 5516. The terminal 5518 is formed using the same conductive film as the pixel electrode 5111, and is electrically connected to any of the pixel portion 5101, the first scan line driver circuit 5102, the second scan line driver circuit 5103, and the signal line driver circuit 5104. The FPC 5200 is connected to the terminal 5518 with an anisotropic conducting material film 5519 interposed therebetween. In addition, the IC chip 5530 is fixed to the FPC 5200 with an anisotropic conductor film 5520 interposed therebetween. That is, the terminal 5518, the FPC 5200, and the IC chip 5530 are electrically connected to each other.

The IC chip 5530 is not necessarily provided. When the IC chip 5530 includes a functional circuit (a memory or a buffer), the area of the substrate can be efficiently used.

Note that in this embodiment mode, the MVA mode liquid crystal display device is illustrated; however, display may be conducted with a patterned vertical alignment (PVA) mode. In the case of the PVA mode, the counter electrode 5511 may be provided with a slit in the structure of FIG. 8B. In addition, as a driving mode of liquid crystal, without limitation to the MVA mode or the PVA mode, a twisted nematic (TN) mode, an in-plane-switching (IPS) mode, a fringe field switching (FFS) mode, an axially symmetric aligned micro-cell (ASM) mode, an optical compensated bend (OCB) mode, a ferroelectric liquid crystal (FLC) mode, an antiferroelectric liquid crystal (AFLC) mode, or the like can be used.

Various display devices such as an electroluminescence display device, a field emission display, or a plasma display in addition to the liquid crystal display device can be used for the image output device 102. In addition, various picture recorders such as a hard disc recorder or a DVD recorder may be used for the image output device 102.

(Embodiment Mode 5)

In this embodiment mode, a structural example of an image processing system provided with a display portion is described.

Figure 9:
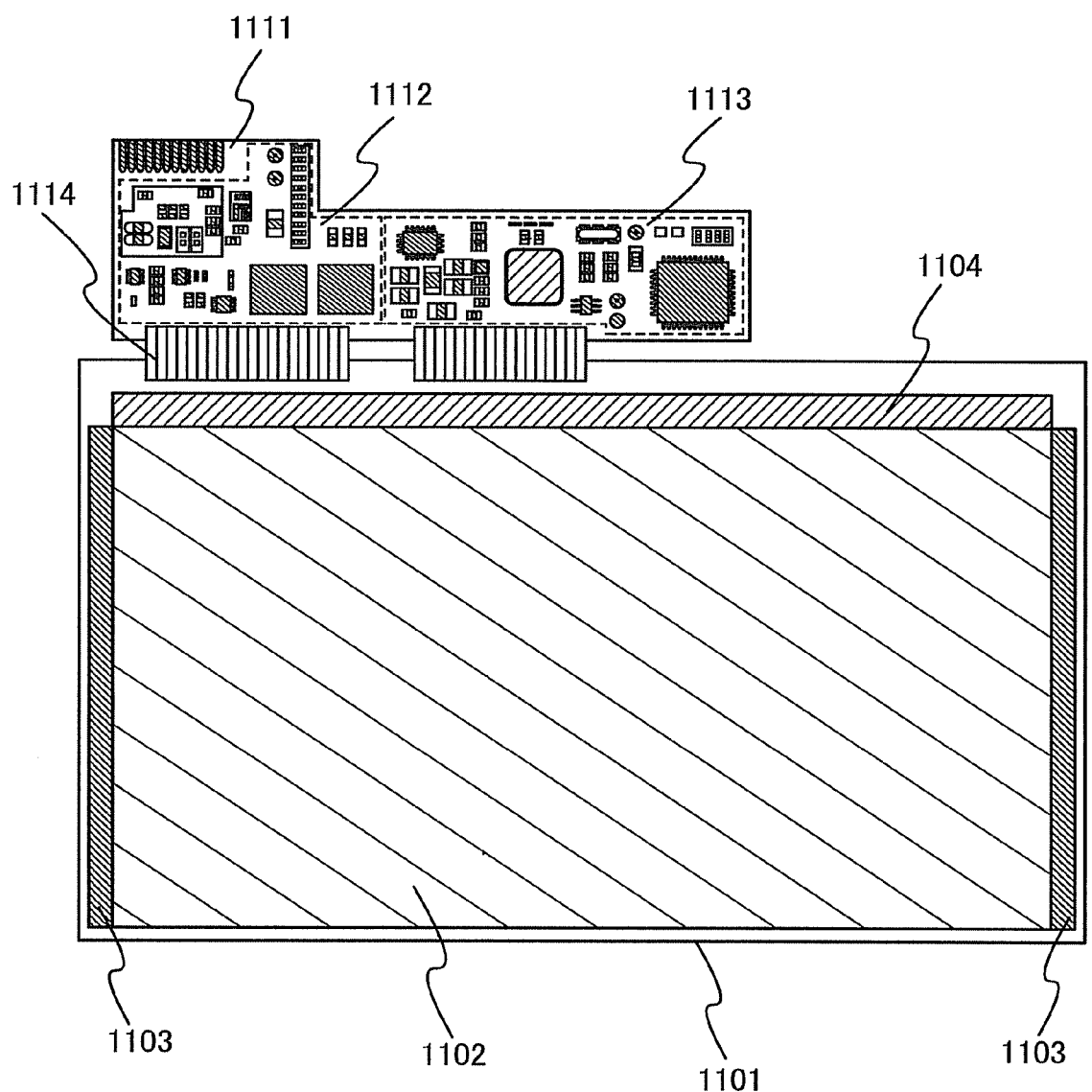
FIG. 9 illustrates a structural example of an image processing system.

FIG. 9 illustrates an example of the image processing system that combined with a display device 1101 and a circuit board 1111. The circuit board 1111 is provided with the image processing device 101. The display device 1101 is the image output device 102, and for example, the liquid crystal display device in Embodiment Mode 3 is used. The display device 1101 has a pixel portion 1102, scan line driver circuits 1103, and a signal line driver circuit 1104. The circuit board 1111 is provided with a control circuit 1112, an arithmetic circuit 1113, and the like, for example. The display device 1101 and the circuit board 1111 are connected to each other through a connection wiring 1114. An FPC or the like can be used as the connection wiring 1114.

For example, a television receiver can be completed using the image processing system illustrated in FIG. 9. An image processing system (image display system) disclosed in this specification is formed as the television receiver, whereby a viewer can watch a television program as an image with a high realistic sense.

Figure 10A:
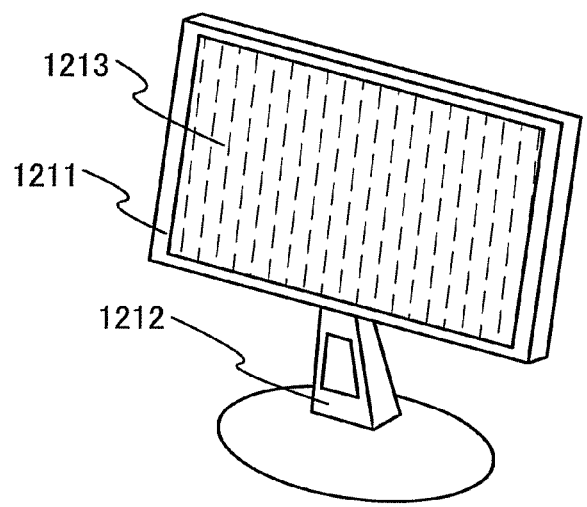
FIG. 10A is an external view illustrating a structural example of a monitor.
Figure 10B:
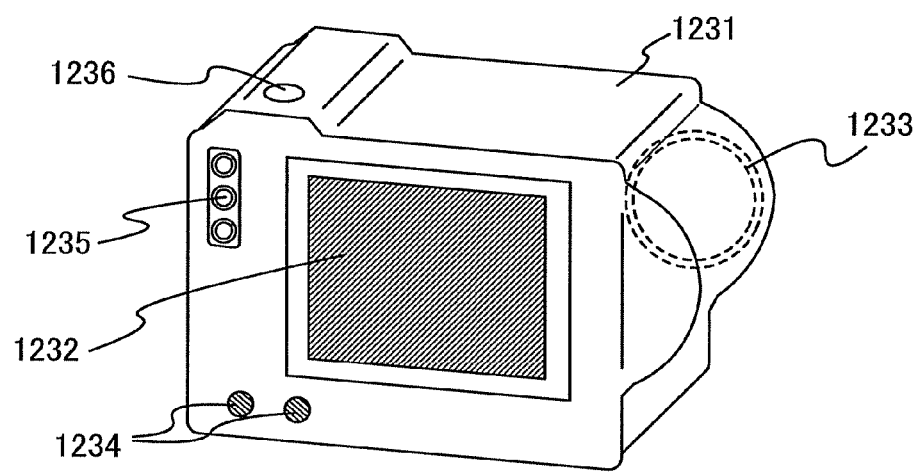
FIG. 10B is an external view illustrating a structural example of a camera.
Figure 10C:
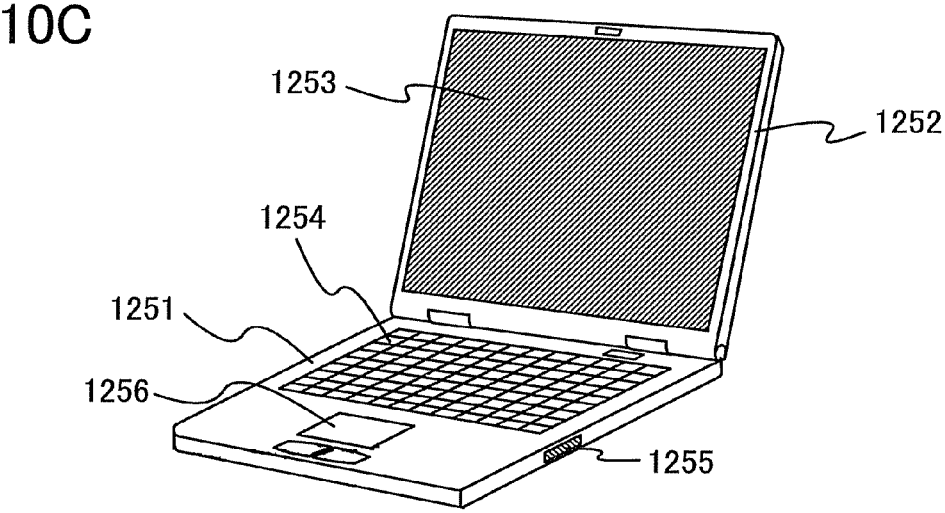
FIG. 10C is an external view illustrating a structural example of a computer.

The image processing system disclosed in this specification can be applied to various electronic devices. Examples of such an electronic device are cameras such as video cameras and digital cameras, goggle displays, navigation systems, computers, game machines, portable information terminals (e.g. mobile computers, cellular phones, portable game machines, and e-book readers), and image reproducing devices. Note that typical image reproducing devices are devices that have a function of reproducing recorded image data stored in a storage medium such as a digital versatile disc (DVD) or a hard disc, and displaying the image data. Examples of electronic devices are described with reference to FIGS. 10A to 10C. FIGS. 10A to 10C are external views of electric devices of this embodiment mode.

FIG. 10A is an external view of a monitor. The monitor includes a chassis 1211, a support base 1212, and a display portion 1213. The monitor illustrated in FIG. 10A has a function of displaying various kinds of information (e.g. a still image, a moving image, and a text image) on the display portion. Note that the monitor illustrated in FIG. 10A is not limited to having the function, and can have various functions.

FIG. 10B is an external view of a camera. The camera includes a main body 1231, a display portion 1232, an image receiving portion 1233, operation keys 1234, an external connection port 1235, and a shutter button 1236. The camera illustrated in FIG. 10B has a function of photographing a still image and a moving image. The camera is provided with an image processing device that corrects a photographed moving image and still image. Accordingly, the moving image can be corrected in the camera, and a corrected moving image can be written to various kinds of storage media. Note that the camera illustrated in FIG. 10B is not limited to having these functions, and can have various functions.

FIG. 10C is an external view of a computer. The computer includes a main body 1251, a housing 1252, a display portion 1253, a keyboard 1254, an external connection port 1255, and a pointing device 1256. In addition, an image processing device is included. The computer illustrated in FIG. 10C has a function of displaying various kinds of information (e.g. a still image, a moving image, and a text image) on the display portion. An image processing is performed on a moving image in response to input by the keyboard 1254 or the pointing device 1256, for example. Note that the computer illustrated in FIG. 10C is not limited to having these functions, and can have various functions.

This embodiment mode can be implemented in combination with any of the embodiment modes as appropriate.

This application is based on Japanese Patent Application serial no. 2008-054626 filed with Japan Patent Office on Mar. 5, 2008, the entire contents of which are hereby incorporated by reference.

What is claimed is:

1. An image processing method for processing a moving image including a plurality of frame images, comprising the steps of:
dividing one of the plurality of frame images into a moving object region including a pixel group generating a moving object and a background region including a pixel group not generating the moving object; and
performing a first image processing on the background region of the one of the plurality of frame images,
performing a second image processing different from the first image processing on the moving object region of the one of the plurality of frame images,
wherein the first image processing is a blurring processing, and the blurring processing on the background region and the second image processing on the moving object region are emphasized depending on a ratio of an area of the moving object region in the one of the plurality of frame images.

2. The image processing method according to claim 1, wherein the blurring processing is not performed on the background region when the ratio of the moving object region in the one of the plurality of frame images is smaller than a predetermined value.

3. The image processing method according to claim 1, wherein the second image processing includes at least one image processing of a sharpening processing, a contrast conversion processing that enhances contrast, and an edge enhancement processing.

4. The image processing method according to claim 1, wherein at least one image processing of an averaging processing, a median filter processing, a contrast conversion processing that weakens contrast, and a mosaic processing is performed as the blurring processing.

5. An image processing method for processing a moving image including a plurality of frame images, comprising the steps of:
extracting a pixel generating a moving object from a first frame image based on a difference between the first frame image and a second frame image which is k frames before the first frame image and a difference between the first frame image and a third frame image which is k frames after the first frame image, and generating a mask image formed using a moving object region including the pixel generating the moving object and a background region including a pixel not generating the moving object, wherein k is natural number;
determining whether each pixel generating the first frame image is included in the background region or the moving object region, by using the mask image; and
performing a first image processing on pixels included in the background region,
performing a second image processing different from the first image processing on pixels included in the moving object region,
wherein the first image processing is a blurring processing, and the blurring processing on the background region and the second image processing are emphasized depending on a ratio of an area of the moving object region in the first frame image.

6. The image processing method according to claim 5, wherein the blurring processing is not performed on the pixel included in the background region in the first image processing when the ratio of the moving object region in the first frame image is smaller than a predetermined value.

7. The image processing method according to claim 5, wherein at least one image processing of a sharpening processing, a contrast conversion processing that enhances contrast, and an edge enhancement processing is performed as the second image processing.

8. The image processing method according to claim 5, wherein at least one image processing of an averaging processing, a median filter processing, a contrast conversion processing that weakens contrast, and a mosaic processing is performed as the blurring processing.

9. An image processing system comprising:
   an image display portion;
   a moving object extraction portion extracting a moving object from each of plurality of frame images and dividing into a moving object region including a pixel group generating the moving object and a background region including a pixel group not generating the moving object; and
   a correction frame image generation portion generating a plurality of correction frame images by performing a first image processing on the background region and a second image processing different from the first image processing on the moving object region in each of the plurality of frame images,
   wherein the image display portion displays the plurality of correction frame images to display a moving image, and
   wherein the first image processing is a blurring processing, and the blurring processing on the background region and the second image processing on the moving object region are emphasized depending on a ratio of an area of the moving object region in each of the plurality of frame images.

10. The image processing system according to claim 9, wherein the correction frame image generation portion does not perform the blurring processing on the background region when the ratio of the moving object region in the one of the plurality of frame images is smaller than a predetermined value.

11. The image processing system according to claim 9, wherein the correction frame image generation portion performs at least one image processing of a sharpening processing, a contrast conversion processing that enhances contrast, and an edge enhancement processing as the second image processing.

12. The image processing system according to claim 9, wherein the correction frame image generation portion performs at least one image processing of an averaging processing, a median filter processing, a contrast conversion processing that weakens contrast, and a mosaic processing as the blurring processing.

13. An image processing system comprising:
   an image display portion;
   a mask image generation portion extracting a pixel generating a moving object from a first frame image of a plurality of frame images, based on a difference between the first frame image and a second frame image which is k frames before the first frame image and a difference between the first frame image and a third frame image which is k frames after the first frame image, and generating a plurality of mask images, each of the plurality of mask images being formed using a moving object region including a pixel group generating the moving object and a background region including a pixel group not generating the moving object, wherein k is natural number; and
   a correction frame image generation portion determining whether each pixel generating each of the plurality of frame images is included in the background region or the moving object region, by using each of the plurality of mask images, and performing a first image processing on pixels of the background region and a second image processing different from the first image processing on pixels of the moving object region in each of a plurality of frame images to generate a plurality of correction frame images,
   wherein the image display portion displays the plurality of correction frame images to display a moving image, and
   wherein the first image processing is a blurring processing, and the blurring processing on the background region and the second image processing on the moving object region emphasized depending on a ratio of an area of the moving object region in each of the plurality of frame images.

14. The image processing system according to claim 13, wherein the correction frame image generation portion does not perform the blurring processing on the pixels of the background region in the first image processing when the ratio of the moving object region in the first frame image is smaller than a predetermined value.

15. The image processing system according to claim 13, wherein the correction frame image generation portion performs at least one image processing of a sharpening processing, a contrast conversion processing that enhances contrast, and an edge enhancement processing as the second image processing.

16. The image processing system according to claim 13, wherein the correction frame image generation portion performs at least one image processing of an averaging processing, a median filter processing, a contrast conversion processing that weakens contrast, and a mosaic processing as the blurring processing.

17. A computer-readable non-transitory memory device storing a computer program for image processing of a moving image including a plurality of frame images, the computer program, when executed, causing an image processing device to perform the following steps:
   a first processing for extracting a moving object from at least one of the plurality of frame images and to divide the at least one of the plurality of frame images into a moving object region including a pixel group generating the moving object and a background region including a pixel group not generating the moving object; and
   a second processing for generating a correction frame image by performing a first image processing on the background region and a second image processing different from the first image processing on the moving object region,
   wherein the first image processing performed on the background region in the second processing is a blurring processing, and the blurring processing on the background region and the second image processing on the moving object region are emphasized depending on a ratio of an area of the moving object region in the one of the plurality of frame images.

18. The computer-readable non-transitory memory device storing a computer program according to claim 17, wherein the blurring processing is not performed on the background region when the ratio of the moving object region in the one of the plurality of frame images is smaller than a predetermined value.

19. The computer-readable non-transitory memory device storing a computer program according to claim 17, wherein the second image processing includes at least one image processing of a sharpening processing, a contrast conversion processing that enhances contrast, and an edge enhancement processing.

20. The computer-readable non-transitory memory device storing a computer program according to claim 17, wherein at least one image processing of an averaging processing, a median filter processing, a contrast conversion processing that weakens contrast, and a mosaic processing is performed as the blurring processing.

21. A computer-readable non-transitory memory device storing a computer program for an image processing of a moving image including a plurality of frame images, the computer program, when executed, causing an image processing device to perform the following steps:

a first processing for extracting a pixel generating a moving object from a first frame image based on a difference between the first frame image to be an correction object and a second frame image which is k frames before the first frame image and a difference between the first frame image and a third frame image which is k frames after the first frame image, and to generate a mask image formed using a moving object region including a pixel group generating the moving object and a background region including a pixel group not generating the moving object, wherein k is natural number; and a second processing for determining whether each pixel generating the first frame image is included in the background region or the moving object region, by using the mask image, to perform a first image processing on pixels of the background region, and a second image processing different from the first image processing on pixels of the moving object region to generate a correction frame image, wherein the first image processing performed on the background region in the second processing is a blurring processing, and the blurring processing on the background region and the second image processing are emphasized depending on a ratio of an area of the moving object region in the first frame image.

22. The computer-readable non-transitory memory device storing a computer program according to claim 21, wherein a blurring processing is not performed on the pixel in the first image processing when the ratio of the moving object region in the first frame image is smaller than a predetermined value.

23. The computer-readable non-transitory memory device storing a computer program according to claim 21, wherein the second image processing includes at least one image processing of a sharpening processing, a contrast conversion processing that enhances contrast, and an edge enhancement processing.

24. The computer-readable non-transitory memory device storing a computer program according to claim 21, wherein at least one image processing of an averaging processing, a median filter processing, a contrast conversion processing that weakens contrast, and a mosaic processing is performed as the blurring processing.

* * * * *